US012548927B2

(12) United States Patent
Han et al.

(10) Patent No.: US 12,548,927 B2
(45) Date of Patent: Feb. 10, 2026

(54) CONNECTOR WITH INCREASED RIGIDITY AND ELECTRONIC DEVICE INCLUDING THE SAME

(71) Applicant: SAMSUNG ELECTRONICS CO., LTD., Suwon-si (KR)

(72) Inventors: Jaeryong Han, Suwon-si (KR); Heekang Yun, Suwon-si (KR); Inha Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 454 days.

(21) Appl. No.: 17/877,354

(22) Filed: Jul. 29, 2022

(65) Prior Publication Data

US 2023/0107849 A1 Apr. 6, 2023

Related U.S. Application Data

(63) Continuation of application No. PCT/KR2022/010549, filed on Jul. 19, 2022.

(30) Foreign Application Priority Data

Oct. 1, 2021 (KR) ........................ 10-2021-0130474
Oct. 18, 2021 (KR) ........................ 10-2021-0138672

(51) Int. Cl.
*H01R 12/71* (2011.01)
*H01R 13/04* (2006.01)
(Continued)

(52) U.S. Cl.
CPC ........... *H01R 12/716* (2013.01); *H01R 13/04* (2013.01); *H01R 13/10* (2013.01); *H01R 13/502* (2013.01); *H01R 13/115* (2013.01)

(58) Field of Classification Search
CPC ...... H01R 12/716; H01R 13/04; H01R 13/10; H01R 13/502; H01R 13/115; H01R 12/57;
(Continued)

(56) References Cited

U.S. PATENT DOCUMENTS 8,986,027 B2 * 3/2015 Nishimura ............. H01R 43/24
439/74
9,755,372 B2 * 9/2017 Ozeki ................ H01R 13/6591
(Continued)

FOREIGN PATENT DOCUMENTS

CN 112542713 A 3/2021
EP 3836520 A1 6/2021
(Continued)

OTHER PUBLICATIONS

International Search Report and Written Opinion for International Application No. PCT/KR2022/010549; International Filing Date Jul. 19, 2022; Date of Mailing Nov. 7, 2022; 10 Pages.

*Primary Examiner* — Truc T Nguyen
(74) *Attorney, Agent, or Firm* — CANTOR COLBURN LLP

(57) ABSTRACT

A connector includes a base, a protruding portion protruding from a surface of the base, sidewalls surrounding the protruding portion, and a conductive member. The sidewalls include a first and second sidewalls extending parallel to one another in a first direction, a third sidewall extending in a second direction perpendicular to the first direction, and a fourth sidewall extending in the second direction. A conductive member includes a first reinforcing portion covering the first sidewall, a second reinforcing portion covering a region including a corner where the third sidewall and the first sidewall are in contact, a third reinforcing portion covering a region including a corner where the fourth sidewall and the first sidewall are in contact, and a contact
(Continued)

portion covering one end of the protruding portion. The conductive member integrally forms the first reinforcing portion, the second reinforcing portion, the third reinforcing portion, and the contact portion.

20 Claims, 15 Drawing Sheets

(51) Int. Cl.
*H01R 13/10* (2006.01)
*H01R 13/502* (2006.01)
*H01R 13/115* (2006.01)

(58) Field of Classification Search
CPC ........ H01R 12/71; H01R 13/20; H01R 12/73; H01R 13/6585
See application file for complete search history.

(56) References Cited

U.S. PATENT DOCUMENTS

| | | | | |
|---|---|---|---|---|
| 9,899,771 | B2 | 2/2018 | Ashibu et al. | |
| 10,868,378 | B2 | 12/2020 | Ko et al. | |
| 11,296,443 | B2 | 4/2022 | Han et al. | |
| 12,027,802 | B2 | 7/2024 | Someya et al. | |
| 2006/0172589 | A1* | 8/2006 | Watanabe | H01R 13/6582 439/495 |
| 2009/0061655 | A1* | 3/2009 | Miyazaki | H01R 13/20 439/74 |
| 2014/0364003 | A1* | 12/2014 | Yunoki | H01R 12/716 439/374 |
| 2016/0036145 | A1* | 2/2016 | Hasegawa | H01R 12/73 439/78 |
| 2016/0294082 | A1* | 10/2016 | Matsuno | H01R 13/6275 |
| 2017/0264048 | A1* | 9/2017 | Ashibu | H01R 13/631 |
| 2018/0198241 | A1* | 7/2018 | Ooi | H01R 13/6597 |
| 2018/0331444 | A1* | 11/2018 | Ono | H01R 13/504 |
| 2020/0212634 | A1* | 7/2020 | Teruki | H01R 12/73 |
| 2021/0044042 | A1* | 2/2021 | Ko | H01R 12/716 |
| 2021/0359459 | A1* | 11/2021 | Oosaka | H01R 13/629 |
| 2021/0384662 | A1* | 12/2021 | Lee | H01R 12/79 |
| 2023/0144353 | A1* | 5/2023 | Oh | H01R 13/6582 439/74 |

FOREIGN PATENT DOCUMENTS

| | | | |
|---|---|---|---|
| JP | 6041949 | B2 | 11/2016 |
| JP | 2021093274 | A | 6/2021 |
| JP | 2021108280 | A | 7/2021 |
| KR | 101656514 | B1 | 9/2016 |
| KR | 20170106911 | A | 9/2017 |
| KR | 20190044922 | A | 5/2019 |
| KR | 101990508 | B1 | 6/2019 |
| KR | 20190101600 | A | 9/2019 |
| KR | 20200006876 | A | 1/2020 |
| KR | 102213339 | B1 | 2/2021 |
| WO | 2020139875 | A1 | 7/2020 |

* cited by examiner

CONNECTOR WITH INCREASED RIGIDITY AND ELECTRONIC DEVICE INCLUDING THE SAME

CROSS-REFERENCE TO RELATED APPLICATIONS

This application is a continuation of International Application No. PCT/KR2022/010549 designating the United States, filed on Jul. 19, 2022, in the Korean Intellectual Property Receiving Office, and claiming priority to Korean Patent Application No. 10-2021-0138672, filed on Oct. 18, 2021, in the Korean Intellectual Property Office, and Korean Patent Application No. 10-2021-0130474, filed on Oct. 1, 2021, in the Korean Intellectual Property Office, the disclosures of which are incorporated by reference herein in their entireties.

BACKGROUND

Field

The following descriptions relate to a connector with increased rigidity and an electronic device including the same.

Description of Related Art

Electronic devices may utilizes one or more connectors to electrically connect one or more internal components to a board such as for example, a printed circuit board (PCB). In addition, the connectors employed in the electronic device can include a board-to-board (BtoB) connector to establish electrical connection between different or separate boards.

The internal components of the electronic device connected to the board by connectors can be replaced by detachable connectors. For example, a BtoB connector may include a socket connector and a plug connector detachably coupled to the socket connector. The socket connector and the plug connector may be coupled to each other to form an electrical connection between internal components of the electronic device for power supply or data signal transmission.

As the size of electronic devices are reduced to promote portability, the sizes and footprints of internal components of the electronic device and connectors electrically connecting internal components are also reduced. When the size of the connector is reduced, the socket connector or the plug connector may not have sufficient rigidity to secure the expected lifespan of the electronic device. To secure an expected lifespan of an electronic device, a method capable of increasing the rigidity of a connector is required.

The technical problems to be achieved in this document are not limited to those described above, and other technical problems not mentioned herein will be clearly understood by those having ordinary knowledge in the art to which the present disclosure belongs, from the following description.

SUMMARY

According to an embodiment, a connector may comprise a base; a protruding portion protruding from one surface of the base; sidewalls surrounding the protruding portion and including a first sidewall extending in a first direction, a second sidewall extending parallel to the first sidewall, a third sidewall extending in a second direction perpendicular to the first direction from one end of the first sidewall to one end of the second sidewall, and a fourth sidewall extending in the second direction from another end of the first sidewall to another end of the second sidewall; and a conductive member including a first reinforcing portion covering the first sidewall, a second reinforcing portion covering a region including a corner where the third sidewall and the first sidewall are in contact, and a third reinforcing portion covering a region including a corner where the fourth sidewall and the first sidewall are in contact, and a contact portion covering one end of the protruding portion, wherein, the contact portion may be electrically connected to a movable terminal of another connector, when coupled to another connector distinct from the connector, and wherein the conductive member may integrally form the first reinforcing portion, the second reinforcing portion, the third reinforcing portion, and the contact portion.

According to an embodiment, an electronic device may comprise a first connector disposed on the printed circuit board; and a second connector detachably coupled to the first connector, wherein the first connector may include a base; a protruding portion protruding from one surface of the base; sidewalls surrounding the protruding portion and including a first sidewall extending in a first direction, a second sidewall extending parallel to the first sidewall, a third sidewall extending in a second direction perpendicular to the first direction from one end of the first sidewall to one end of the second sidewall, and a fourth sidewall extending in the second direction from another end of the first sidewall to another end of the second sidewall; and a conductive member including a first reinforcing portion covering the first sidewall, a second reinforcing portion covering a region including a corner where the third sidewall and the first sidewall are in contact, and a third reinforcing portion covering a region including a corner where the fourth sidewall and the first sidewall are in contact, and a contact portion covering one end of the protruding portion, wherein the conductive member may integrally form the first reinforcing portion, the second reinforcing portion, the third reinforcing portion, and the contact portion, wherein the second connector may include a mold; and a movable terminal disposed on the mold, deformable by the contact portion and in contact with the contact portion when coupled with the first connector, wherein the contact portion of the first connector may be electrically connected to the movable terminal of the second connector when the first connector is coupled to the second connector.

According to an embodiment, the connector having increased rigidity can be prevented from being damaged due to stress caused by coupling of the connectors, since the conductive member surrounds the region including the periphery where the side walls contact each other.

The effects that can be obtained from the present disclosure are not limited to those described above, and any other effects not mentioned herein will be clearly understood by those having ordinary knowledge in the art to which the present disclosure belongs, from the following description.

DETAILED DESCRIPTION

Figure 1:
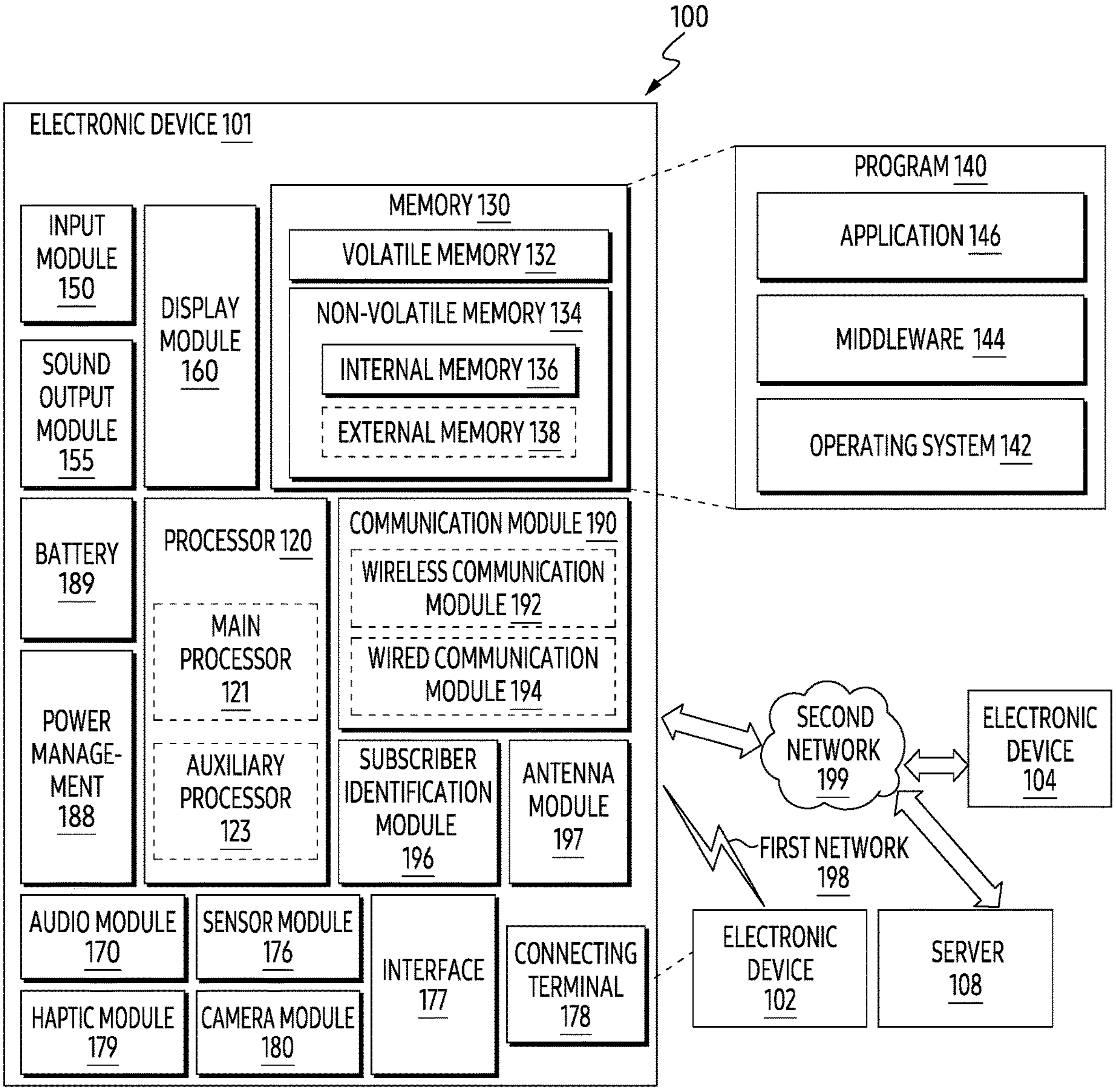
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
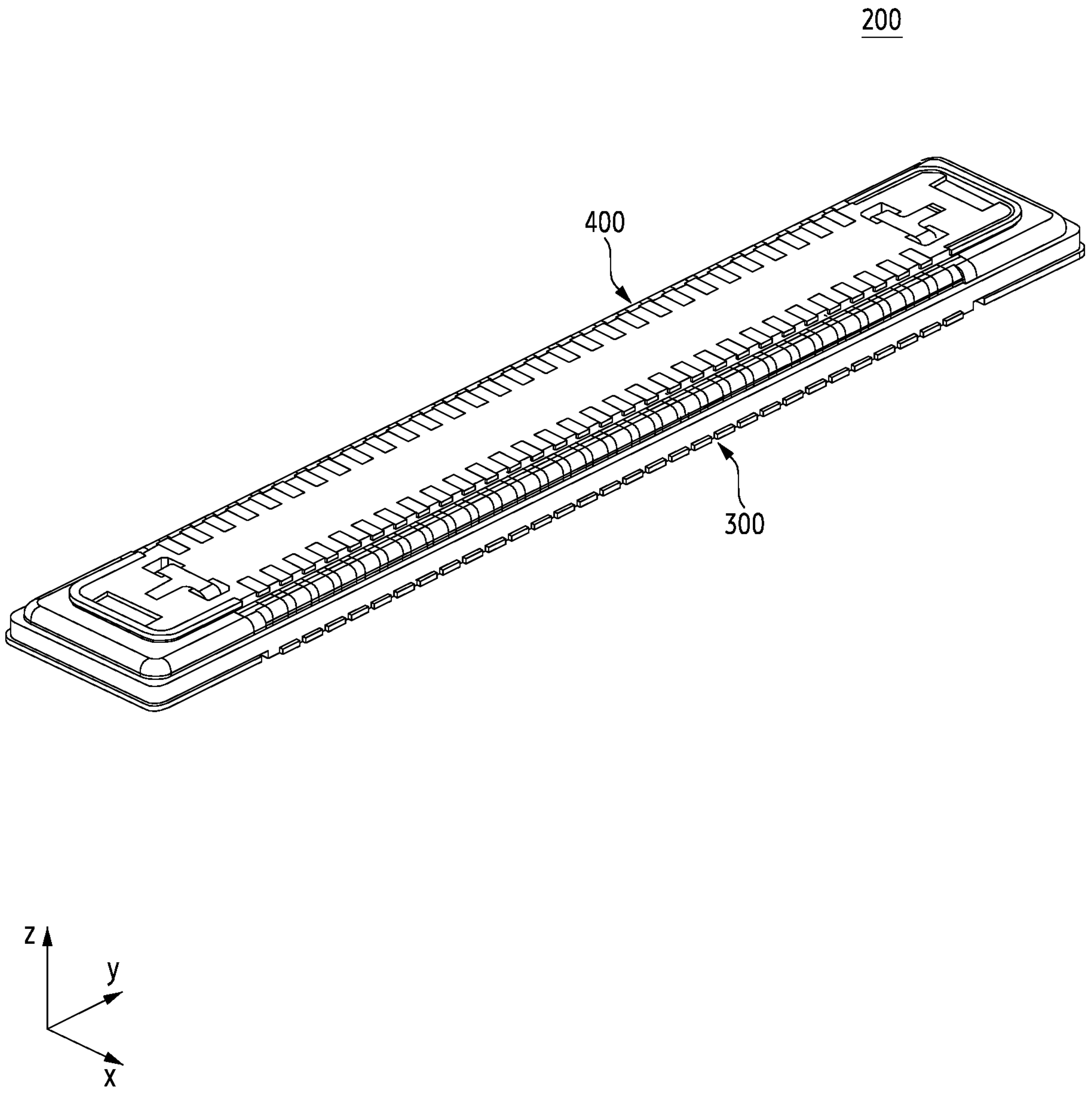
FIG. 2A is a perspective view of a connector according to an embodiment.
Figure 2B:
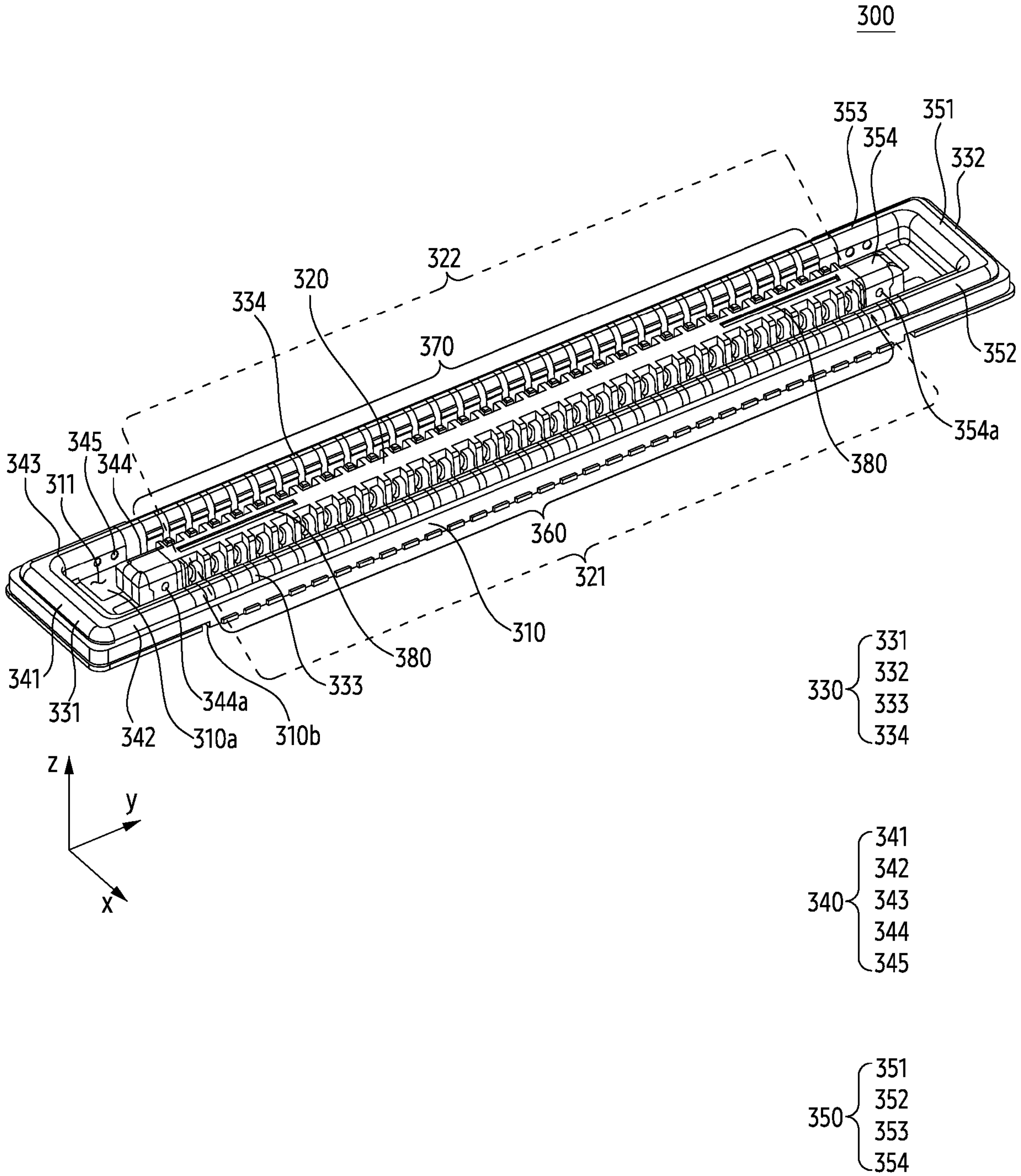
FIG. 2B is a perspective view of a first connector according to an embodiment.
Figure 2C:
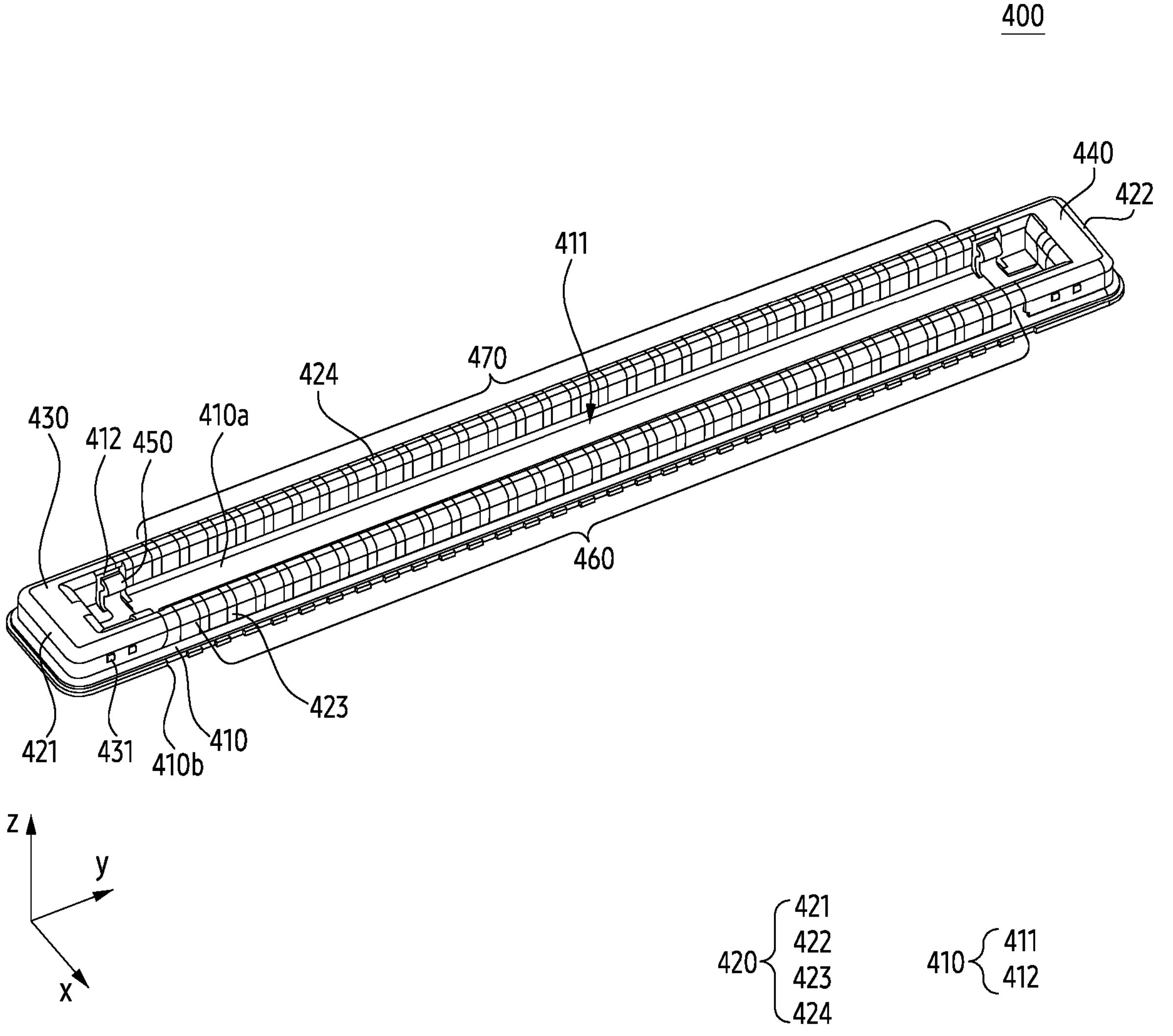
FIG. 2C is a perspective view of a second connector according to an embodiment.

FIG. 2A is a perspective view of a connector according to an embodiment, FIG. 2B is a perspective view of a first connector according to an embodiment, and FIG. 2C is a perspective view of a second connector according to an embodiment.

Referring to FIGS. 2A, 2B, and 2C, a pair of connectors 200 may include a first connector 300 and a second connector 400. The pair of connectors 200 may electrically connect the internal components of the electronic device (e.g., the electronic device 101 of FIG. 1). For example, one connector disposed on the printed circuit board may be fastened to another connector (e.g., a second connector) disposed at an end portion of an electrical line (e.g., a wire or trace) electrically connected to an internal component of the electronic device 100, so that the pair of connectors 200 may electrically connect the internal component of the electronic device 100 to the printed circuit board. According to an embodiment, one connector included in the pair of connectors 200 may be fixed on the printed circuit board by soldering. For example, the first connector 300 included in the pair of connectors 200 may be electrically connected to the printed circuit board by being soldered to the printed circuit board. According to an embodiment, the first connector 300 and the second connector 400 include sockets and plugs in a BtoB connector for connecting to different separate substrates (e.g., PCBs). The first connector 300 and the second connector 400 may be disposed on different printed circuit boards a to provide an electrical path through which a signal for supplying power or a signal for data transmission is input or output. For example, the first connector 300 may be disposed on a printed circuit board, and the second connector 400 may be disposed on a flexible printed circuit board (FPCB), but is not limited thereto. For example, the first connector 300 may be a socket connector soldered on a printed circuit board, and the second connector 400 may be a plug connector connected to one end of the FPCB. The other end of the FPCB may be connected to another printed circuit board distinguished from the printed circuit board or other components. The other end of the FPCB may include the same or a similar plug connector as the second connector 400, and the plug connector positioned at the other end of the FPCB may be coupled to a socket connector disposed on another printed circuit board or another component. According to another example, the other end of the FPCB may be integrally formed with signal lines (e.g., wires or traces) extending from the other printed circuit board or other components instead of the connector being disposed on another printed circuit board or another component. Since the first connector 300 and the second connector 400 are coupled together (e.g., fastened), the pair of connectors 200 may electrically connect the printed circuit board and other printed circuit boards or the printed circuit board and other components.

According to an embodiment, the first connector 300 may include a base 310, a protruding portion 320, sidewalls 330, conductive members 340 and 350, a plurality of signal terminals 360 and 370, and a reinforcing member 380.

According to an embodiment, the base 310, the protruding portion 320, and the sidewalls 330 may form the outer profile of the first connector 300. In one or more non-limiting embodiments, the base 310, the protruding portion 320, and the sidewalls 330 are integrally formed, and may be formed of a polymer material. For example, the base 310, the protruding portion 320, and the sidewalls 330 may be formed from a mold or additive manufacturing process (e.g., three-dimensional printing) and made of a non-conductive material having rigidity. For example, the base 310 may be made of an insulator including a non-conductive material such as resin and epoxy but is not limited thereto.

According to an embodiment, when the first connector 300 and the second connector 400 are coupled, one surface 310*a* of the base 310 may face the second connector 400, and the other surface 310*b* (e.g., an opposite surface 310) facing the one surface 310*a* (e.g., located opposite surface 310*a*) may face the printed circuit board of the electronic device 101. The base 310 may be disposed on the printed circuit board of the electronic device 101. For example, the other surface 310*b* of the base 310 may be disposed on the printed circuit board. The first connector 300 may include a conductive material exposed to the other surface 310*b*. The conductive material exposed to the other surface 310*b* of the first connector 300 may be soldered with the conductive material exposed to the printed circuit board. By contacting the conductive materials, the first connector 300 can be electrically connected to the printed circuit board.

According to an embodiment, the base 310 may include a recess 311. The recess 311 may be formed on one surface 310*a* of the base 310 and may define an empty space to which the second connector 400 is coupled. For example, the recess 311 may have a shape corresponding to the shape of the second connector 400. The empty space of the recess 311 may be a space capable of accommodating a portion of the second connector 400.

According to an embodiment, when the first connector 300 and the second connector 400 are connected together (e.g., fastened), the protruding portion 320 may guide the connecting position of the second connector 400. The protruding portion 320 may be formed in a shape corresponding to the accommodation space 411 of the second connector 400. For example, when the first connector 300 and the second connector 400 are connected, the protruding portion 320 may occupy the accommodation space 411 of the second connector 400.

According to an embodiment, the protruding portion 320 may include a portion of the base 310 surrounded by the recess 311 and may be spaced apart from the sidewalls 330 formed in the base 310. According to an embodiment, the protruding portion 320 may protrude from one surface 310*a* of the base 310. For example, the protruding portion 320 may have a shape protruding from the center of the base surface 310*a* and may extend in a lengthwise direction (e.g., the y-axis) to define a length of the protruding portion 320. For example, the protruding portion 320 may be disposed on an axis of symmetry of the base 310 formed in a longitudinal direction (e.g., a y-axis direction) of the base 310, and may extend along the axis of symmetry.

According to an embodiment, the sidewalls 330 may be portions in which terminals for transmitting signals and power are disposed when the first connector 300 and the second connector 400 are coupled. The sidewalls 330 may be disposed on one surface 310*a* of the base 310 and may form a recess 311. According to an embodiment, the sidewalls 330 may surround the protruding portion 320. For example, the sidewalls 330 may form a recess 311 together with the protruding portion 320. The sidewalls 330 may be spaced apart from the protruding portion 320 and may form a recess 311 between the sidewalls 330 and the protruding portion 320. According to an embodiment, the sidewalls 330 may include a first sidewall 331, a second sidewall 332, a third sidewall 333, and a fourth sidewall 334. The first sidewall 331 may extend in a first direction (−x direction). The second sidewall 332 may extend substantially parallel to the first sidewall 331. For example, the second sidewall 332 may be spaced apart from the first sidewall 331 in a second direction (+y direction) substantially perpendicular to the first direction and extend in the first direction (−x direction). The third sidewall 333 may extend from one end of the first sidewall 331 to one end of the second sidewall 332 in the second direction (+y direction). The fourth sidewall 334 may extend from the other end of the first sidewall 331 to the other end of the second sidewall 332 in the second direction. According to an embodiment, the third sidewall 333 may be spaced apart from the fourth sidewall 334 in the first direction (−x direction) and may extend substantially parallel to the fourth sidewall 334.

According to an embodiment, the sidewalls 330 may include corners formed at positions where one of the sidewalls 330 and contacts another sidewall 330. For example, the corner may be formed at a first position where the first sidewall 331 and the third sidewall 333 are in contact with each other, a second position where the first sidewall 331 and the fourth sidewall 334 are in contact with each other, a third position where the second sidewall 332 and the third sidewall 333 are in contact with each other, and fourth a position where the second sidewall 332 and the fourth sidewall 334 are in contact with each other. According to an embodiment, the angle of the corner may vary according to the angle at which each of the sidewalls 330 contact each another. For example, the angle of the corner may be a right angle by contacting the sidewalls 330 so that they are orthogonal to each other. For another example, the corner may have a curvature as at least one of the sidewalls 330 is bent in a region adjacent to the corner.

According to an embodiment, the conductive members 340 and 350 may function as power terminals of the first connector 300 by inputting or outputting an electrical signal for supplying power. The conductive members 340 and 350 may serve as a power terminal of the first connector 300 and, at the same time, function as a reinforcing member to prevent damage to the first connector 300. For example, when the first connector 300 and the second connector 400 are coupled, the conductive members 340 and 350 may be made of a material having increased rigidity compared to the base 310 to prevent the base 310 and the protruding portion 320 from being damaged by the second connector 400. For example, the conductive members 340 and 350 may be made of a metal material including, but not limited to, copper, which has excellent electrical conductivity. According to an embodiment, the conductive members 340 and 350 may include a first conductive member 340 and a second conductive member 350. The first conductive member 340 may be disposed at one periphery of the first connector 300. The second conductive member 350 may be disposed at another periphery of the first connector 300 facing one periphery of the first connector 300 on which the first conductive member 340 is disposed. According to an embodiment, the first conductive member 340 and the second conductive member 350 may function as electrode terminals having opposite polarities. For example, when the first conductive member 340 functions as an anode terminal, the second conductive member 350 may function as a cathode terminal.

According to an embodiment, the first conductive member 340 may include a first reinforcing portion 341, a second reinforcing portion 342, a third reinforcing portion 343, and a first contact portion 344. According to an embodiment, the first conductive member 340 may integrally form a first reinforcing portion 341, a second reinforcing portion 342, a third reinforcing portion 343, and a first contact portion 344.

According to an embodiment, the first reinforcing portion 341 may be disposed to surround the first sidewall 331. For example, the first reinforcing portion 341 may surround the first sidewall 331 and extend in the first direction (−x direction) from one end of the first sidewall 331 to the other end of the first sidewall 331. According to an embodiment, a portion of the first reinforcing portion 341 may cover a portion of one surface 310*a* of the base 310. For example, the first reinforcing portion 341 may surround a portion of the recess 311. The first reinforcing portion 341 may be disposed to surround a portion of the recess 311 in contact with the first sidewall 331. According to an embodiment, a portion of the first reinforcing portion 341 positioned on one surface 310*a* of the base 310 can prevent the one surface 310*a* from being damaged by the second connector 400.

According to an embodiment, the second reinforcing portion 342 may be disposed to surround a region including a corner where the first sidewall 331 and the third sidewall 333 contact each other. For example, the second reinforcing portion 342 may extend in the second direction (+y direction) from the corner formed by the first sidewall 331 and the third sidewall 333 and surround a portion of the third sidewall 333.

According to an embodiment, the third reinforcing portion 343 may be disposed to surround a region including a corner where the first sidewall 331 and the fourth sidewall 334 contact each other. For example, the third reinforcing portion 343 may extend in the second direction (+y direction) from a corner formed by the first sidewall 331 and the fourth sidewall 334 and surround a portion of the fourth sidewall 334. According to a non-limiting embodiment, the corner located where the first sidewall 331 and the third sidewall 333 meet one another and the corner located where the first sidewall 331 and the fourth sidewall 334 meet one another define a first region including a first periphery that is protected from damage (e.g., cracks and/or stress fractures) by the surrounding first conductive member 340.

According to an embodiment, the first reinforcing portion 341, the second reinforcing portion 342, and the third reinforcing portion 343 may be integrally formed. The first reinforcing portion 341 and the second reinforcing portion 342 may prevent a region of the sidewalls 330 from being exposed to the outside including a corner where the first sidewall 331 and the third sidewall 333 contact each other and the first reinforcing portion 341 and the third reinforcing portion 343 may prevent a region of the sidewalls 330 from being exposed to the outside including a corner where the first sidewall 331 and the fourth sidewall 334 contact each other. For example, the first reinforcing portion 341 and the second reinforcing portion 342 may completely surround a region of the sidewalls 330 including a corner where the first sidewall 331 and the third sidewall 333 contact each other, and the first reinforcing portion 341 and the third reinforcing portion 343 may completely surround a region of the sidewalls 330 including a corner where the first sidewall 331 and the fourth sidewall 334 contact each other. The first reinforcing portion 341, the second reinforcing portion 342, and the third reinforcing portion 343 may prevent the first sidewall 331 from being exposed to the outside. For example, the first reinforcing portion 341, the second reinforcing portion 342, and the third reinforcing portion 343 may completely surround the first sidewall 331, since the first reinforcing portion 341 surrounds a portion excluding both ends of the first sidewall 331, and the second reinforcing portion 342 and the third reinforcing portion 343 surround both ends of the first sidewall 331.

According to an embodiment, the first contact portion 344 may be electrically connected to the movable terminal 450 of the second connector 400 when the first connector 300 is coupled to the second connector 400. According to an embodiment, the first contact portion 344 may be disposed to surround one end of the protruding portion 320, and can prevent the protruding portion 320 from being damaged by the second connector 400 when the first connector 300 and the second connector 400 are coupled. For example, the first contact portion 344 may surround each side surfaces of one end portion of the protruding portion 320 facing the first reinforcing portion 341, the second reinforcing portion 342, and the third reinforcing portion 343. According to an embodiment, the first contact portion 344 may include a terminal groove 344*a* electrically connected to the movable terminal of the second connector 400 when the first connector 300 and the second connector 400 are coupled. When the first connector 300 and the second connector 400 are coupled to each other, the terminal groove 344*a* may contact the movable terminal 450 of the second connector 400 to form an electrical contact. For example, the terminal groove 344*a* may be formed on a side surface of the first contact portion 344 facing the second reinforcing portion 342 or a side surface of the first contact portion 344 facing the third reinforcing portion 343.

According to an embodiment, the first conductive member 340 may include a contact groove 345. When the first connector 300 and the second connector 400 are coupled to each other, the contact groove 345 may be in contact with an outer surface of the second connector 400 to form an electrical contact. For example, the contact groove 345 may be formed on a side surface of the second reinforcing portion 342 facing the protruding portion 320 in the first direction (−x direction). As another example, the contact groove 345 may be formed on a side surface of the third reinforcing portion 343 facing the protruding portion 320 in a direction (+x direction) opposite to the first direction.

According to an embodiment, when the first connector 300 is coupled to the second connector 400, the first conductive member 340 may increase a contact area of the conductive member by integrally forming the first reinforcing portion 341, the second reinforcing portion 342, and the third reinforcing portion 343. The first reinforcing portion 341, the second reinforcing portion 342, and the third reinforcing portion 343 may secure a large contact area with the second connector 400 by completely surrounding the first sidewall 331, corners formed at both ends of the first sidewall 331, a portion of the third sidewall 333, and a portion of the fourth sidewall 334. The pair of connectors 200 may increase the amount of current that may flow between the first connector 300 and the second connector 400.

According to an embodiment, the second conductive member 350 may be disposed at a periphery of the first connector 300 so as to be symmetrical to the first conductive member 340 with respect to the protruding portion 320. Since the second conductive member 350 and the first conductive member 340 may be the same or similar to each other, the description of the first conductive member 340 described above may be applied to the second conductive member 350 identically or similarly. For example, the second conductive member 350 may include a fourth reinforcing portion 351, a fifth reinforcing portion 352, a sixth reinforcing portion 353, and a second contact portion 354. According to a non-limiting embodiment, the second conductive member 350 can integrally form the fourth reinforcing portion 351, the fifth reinforcing portion 352, the sixth reinforcing portion 353, and the second contact portion 354. The fourth reinforcing portion 351 may surround the second sidewall 332. The fifth reinforcing portion 352 may surround a region including a corner where the second sidewall 332 and the third sidewall 333 contact each other. The sixth reinforcing portion 353 may surround a region including a corner where the second sidewall 332 and the fourth sidewall 334 contact each other. According to a non-limiting embodiment, the corner located where the second sidewall 332 and the third sidewall 333 meet one another and the corner located where the second sidewall 332 and the fourth sidewall 334 meet one another define a second region including a second periphery that is protected from damage (e.g., cracks and/or stress fractures) by the surrounding second conductive member 350.

The second contact portion 354 may be disposed to surround the other end of the protruding portion 320 opposite to one end portion of the protruding portion 320. The second contact portion 354 may include a terminal groove 354*a* accommodating a part of the movable terminal 450 of the second connector 400 when coupled to the second connector 400.

According to an embodiment, similarly to the first conductive member 340, the fourth reinforcing portion 351, the fifth reinforcing portion 352, and the sixth reinforcing portion 353 may secure a large contact area with the second connector 400 by completely surrounding the second sidewall 332, corners formed at both ends of the second sidewall 332, a part of the third sidewall 333, and a part of the fourth sidewall 334. The pair of connectors 200 may increase the amount of current that may flow between the first connector 300 and the second connector 400.

According to an embodiment, a plurality of signal terminals 360 and 370 may input or output electrical signals for exchanging data between internal components of the electronic device 101. A plurality of signal terminals 360 and 370 may be disposed to be spaced apart from each other. According to an embodiment, signal terminals of a plurality of signal terminals 360 and 370 may input or output different types of electrical signals. For example, a plurality of signal terminals 360 and 370 may be made of a metal material including copper having excellent electrical conductivity but is not limited thereto. According to an embodiment, a plurality of signal terminals 360 and 370 may include a plurality of first signal terminals 360 and a plurality of second signal terminals 370. A plurality of first signal terminals 360 may be spaced apart from the second reinforcing portion 342 and may be spaced apart from each other along the third sidewall 333. For example, a plurality of first signal terminals 360 may be disposed to surround a part of the third sidewall 333. A plurality of second signal terminals 370 may be spaced apart from the third reinforcing portion 343 and may be spaced apart from each other along the fourth sidewall 334. For example, a plurality of second signal terminals 370 may be disposed to surround a part of the fourth sidewall 334.

According to an embodiment, the protruding portion 320 may include a plurality of accommodating grooves 321 and 322. Each of the grooves 321 and 322 may accommodate each of a plurality of signal terminals 360 and 370. According to an embodiment, a plurality of accommodating grooves 321 and 322 may include a plurality of first accommodating grooves 321 and a plurality of second accommodating grooves 322. A plurality of first accommodating grooves 321 may be formed on one side surface of the protruding portion 320 facing the third sidewall 333 to accommodate a plurality of first signal terminals 360. A plurality of second accommodating grooves 322 may be formed on other side surfaces of the protruding portion 320 facing the fourth sidewall 334 to accommodate a plurality of second signal terminals 370. For example, a plurality of first accommodating grooves 321 may be disposed at the positions of one side of the protruding portion 320 corresponding to the positions of the third sidewall 333 on which a plurality of first signal terminals 360 are disposed. A plurality of second accommodating grooves 322 may be disposed at positions of the other side surfaces of the protruding portion 320 corresponding to positions of the fourth sidewall 334 on which a plurality of second signal terminals 370 are disposed.

According to an embodiment, one end of the plurality of first signal terminals 360 may surround the third sidewall 333 and extend along the x-axis (e.g., in the −x-axis direction) from the third sidewall 333 to the protruding portion 320 in the recess 311 to extend to a plurality of first accommodating grooves 321. One end of the plurality of second signal terminals 370 may surround the fourth sidewall 334 and extend along the x-axis (e.g., in the x-axis direction) from the fourth sidewall 334 to the protruding portion 320 in the recess 311 to extend to a plurality of second accommodating grooves 322.

According to an embodiment, the reinforcing member 380 may reinforce the rigidity of the protruding portion 320. For example, when the second connector 400 presses the first connector 300 at a position other than the designated position, the reinforcing member 380 can prevent the protruding portion 320 from being damaged by the partition walls 420 of the second connector 400. According to an embodiment, the reinforcing member 380 may be spaced apart from the contact portions 344 and 354 and may be disposed within the protruding portion 320. For example, the reinforcing member 380 may be accommodated in a groove formed in the protruding portion 320 or may be accommodated in a hole penetrating the protruding portion 320. The reinforcing member 380 may be made of, for example, a material such as a metal having rigidity superior to that of the protruding portion 320.

According to an embodiment, the second connector 400 may include mold 410, partition walls 420, metallic members 430 and 440, movable terminals 450, and a plurality of signal members 460 and 470.

According to an embodiment, the mold 410 may be disposed on a printed circuit board different from the printed circuit board on which the first connector 300 is disposed. According to an embodiment, when the first connector 300 and the second connector 400 are coupled, one surface 410*a* of the mold 410 may face the first connector 300, and the other surface 410*b* facing the one surface 410*a* may face another printed circuit board of the electronic device 101 that is distinguished from the printed circuit board coupled to the first connector 300. For example, the mold 410 may be made of an insulator including resin and epoxy, which are non-conductive materials, but is not limited thereto. According to an embodiment, an accommodation space 411 may be formed in the mold 410. The accommodation space 411 may accommodate the protruding portion 320 of the first connector 300 when the first connector 300 and the second connector 400 are coupled. According to an embodiment, the other printed circuit board connected to the second connector 400 may be a flexible printed circuit board. For example, the flexible printed circuit board may be formed to connect printed circuit boards, and connectors may be attached to both ends.

According to an embodiment, the partition walls 420 may be disposed on one surface 410*a* of the mold 410 and may form an accommodation space 411. The partition walls 420 may surround the protruding portion 320 of the first connector 300 when the first connector 300 and the second connector 400 are coupled. According to an embodiment, the partition walls 420 may include a first partition wall 421, a second partition wall 422, a third partition wall 423, and a fourth partition wall 424. The first partition wall 421 may extend in the first direction (−x direction). The second partition wall 422 may extend substantially parallel to the first partition wall 421. For example, the second partition wall 422 may be spaced apart from the first partition wall 421 in a second direction (+y direction) substantially perpendicular to the first direction and extend in the first direction. The third partition wall 423 may extend from one end of the first partition wall 421 to one end of the second partition wall 422 in the second direction. The fourth partition wall 424 may extend from the other end of the first partition wall 421 to the other end of the second partition wall 422 in the second direction. For example, the fourth partition wall 424 may be spaced apart from the third partition wall 423 along the first direction and extend substantially parallel to the third partition wall 423.

According to an embodiment, when the first connector 300 and the second connector 400 are coupled, the partition walls 420 of the second connector 400 may be in contact with the sidewalls 330 of the first connector 300. For example, when the first connector 300 and the second connector 400 are coupled, the first partition wall 421 may be in contact with the first sidewall 331, the second partition wall 422 may be in contact with the second sidewall 332, the third partition wall 423 may be in contact with the fourth sidewall 334, and the fourth partition wall 424 may be in contact with the third sidewall 333.

According to an embodiment, the partition walls 420 may include corners formed at positions where one of the partition walls 420 and the other partition wall contact each other. For example, the corner may be formed at a position where the first partition wall 421 and the third partition wall 423 are in contact with each other, a position where the first partition wall 421 and the fourth partition wall 424 are in contact with each other, a position where the second partition wall 422 and the third partition wall 423 are in contact with each other, and at a position where the second partition wall 422 and the fourth partition wall 424 are in contact with each other.

According to an embodiment, the partition walls 420 may occupy the recess 311 of the first connector 300 when the first connector 300 and the second connector 400 are fastened. For example, the partition walls 420 may protrude in a shape corresponding to the shape of the recess 311.

According to an embodiment, the metallic members 430 and 440 may function as a power terminal of the second connector 400 by inputting or outputting an electric signal for supplying power. According to an embodiment, the metallic members 430 and 440 may be in contact with the conductive members 340 and 350 of the first connector 300 when the first connector 300 and the second connector 400 are coupled. According to an embodiment, the metallic members 430 and 440 may include a first metallic member 430 and a second metallic member 440. The first metallic member 430 may be disposed at one periphery of the second connector 400. The second metallic member 440 may be spaced apart from the first metallic member 430 and disposed at another periphery of the second connector 400. According to an embodiment, when the first connector 300 and the second connector 400 are coupled, the first metallic member 430 of the second connector 400 may be in contact with the first conductive member 340 of the first connector 300 and the second metallic member 440 of the second connector 400 may be in contact with the second conductive member 350 of the first connector 300.

According to an embodiment, the first metallic member 430 and the second metallic member 440 may function as electrode terminals having opposite polarities. For example, when the first metallic member 430 functions as an anode terminal, the second metallic member 440 may function as a cathode terminal. For example, the metallic members 430 and 440 may be made of a metallic material including, but not limited to, copper, which has excellent electrical conductivity.

According to an embodiment, the first metallic member 430 may surround a region including a corner where one of the partition walls 420 and the another partition wall 420 contact each other. For example, the first metallic member 430 may surround a region including a corner where the first partition 421 and the third partition 423 contact each other, and a region including a corner where the first partition 421 and the fourth partition 424 contact each other. According to an embodiment, the first metallic member 430 may include a contact protrusion 431. When the first connector 300 and the second connector 400 are coupled, the contact protrusion 431 may contact the contact groove 345 of the first conductive member 340 to form an electrical contact. According to an embodiment, the contact protrusion 431 may protrude from the outer surface of the first metallic member 430.

According to an embodiment, the second metallic member 440 may be disposed at a periphery of the second connector 400 so as to be symmetrical to the first metallic member 430 with respect to the accommodation space 411. Since the second metallic member 440 and the first metallic member 430 may be the same or similar to each other, the description of the first metallic member 430 described above may be applied to the second metallic member 440 equally or similarly. For example, the second metallic member 440 may surround a region including a corner in contact with the second partition 422 and the third partition 423 and a region including a corner in contact with the second partition 422 and the fourth partition 424.

According to an embodiment, the movable terminal 450 may be disposed on the mold 410 and may form an electrical connection with the conductive members 340 and 350 of the first connector 300 when the first connector 300 and the second connector 400 are coupled together. According to an embodiment, since the movable terminal 450 may be made of a deformable material (e.g., a flexible polymer), the movable terminal 450 may be deformed by the contact portions 344 and 354 when the first connector 300 and the second connector 400 are coupled. For example, when the first connector 300 and the second connector 400 are coupled together, the movable terminal 450 may be seated in the terminal groove 344*a* of the first contact portion 344 to form an electrical connection with the first contact portion 344.

According to an embodiment, the mold 410 may further include an accommodating portion 412 accommodating a part of the movable terminal 450. The accommodating portion 412 may be disposed in one region of the partition walls 420 adjacent to the metallic members 430 and 440 to surround the movable terminal 450. When the first connector 300 and the second connector 400 are coupled together, the accommodating portion 412 may provide a space through which the movable terminal 450 may move. For example, the accommodating portion 412 may be formed on the third partition wall 423 and the fourth partition wall 424 adjacent to the first metallic member 430. As another example, the accommodating portion 412 may be formed on the third partition wall 423 and the fourth partition wall 424 adjacent to the second metallic member 440.

According to an embodiment, a plurality of signal members 460 and 470 may form an electrical connection with a plurality of signal terminals 360 and 370 when the first connector 300 and the second connector 400 are coupled together. In one or more non-limiting embodiments, the plurality of signal members 460 and 470 may be spaced apart from each other. The plurality of signal members 460 and 470 may input and/or output an electrical signal for exchanging data between internal components of the electronic device 101. According to an embodiment, each of the signal terminals of the plurality of signal members 460 and 470 may input and/or output different types of electrical signals. For example, the plurality of signal members 460 and 470 may be made of a metal material including, but not limited to, copper, which has excellent electrical conductivity.

According to an embodiment, the plurality of signal members 460 and 470 may include a plurality of first signal members 460 and a plurality of second signal members 470. The plurality of first signal members 460 may be spaced apart from the first metallic member 430 and spaced apart from each other along the third partition wall 423. The plurality of second signal members 470 may be spaced apart from the second metallic member 440 and spaced apart from each other along the fourth partition wall 424. According to an embodiment, each of the plurality of first signal members 460 and the plurality of second signal members 470 form an electrical connection with the plurality of first signal terminals 360 and the plurality of second signal terminals 370 when the first connector 300 and the second connector 400 are coupled.

According to the above-described embodiment, since the first connector 300 includes conductive members 340 and 350 and the second connector 400 includes metallic members 430 and 440, the rigidity of pair of connectors 200 can increased. For example, the first conductive member 340 may be disposed to surround a region including a corner formed by the sidewalls 330, thereby enhancing the rigidity of the first connector 300. When the first connector 300 and the second connector 400 are coupled, the second connector 400 may press the sidewalls 330 of the first connector 300. Stress may be generated inside the sidewalls 330 by a force pressed by the second connector 400. The stress may be concentrated at a corner formed by the sidewalls 330. When the first conductive member 340 does not surround the corners formed by the sidewalls 330, the sidewalls 330 may be damaged by stress, and thus the lifespan of the first connector 300 may be reduced. According to an embodiment, since the first conductive member 340 is disposed to surround the corners formed by the sidewalls 330, the rigidity of the first connector 300 may be reinforced, thereby increasing the lifespan of the first connector 300.

Figure 3A:
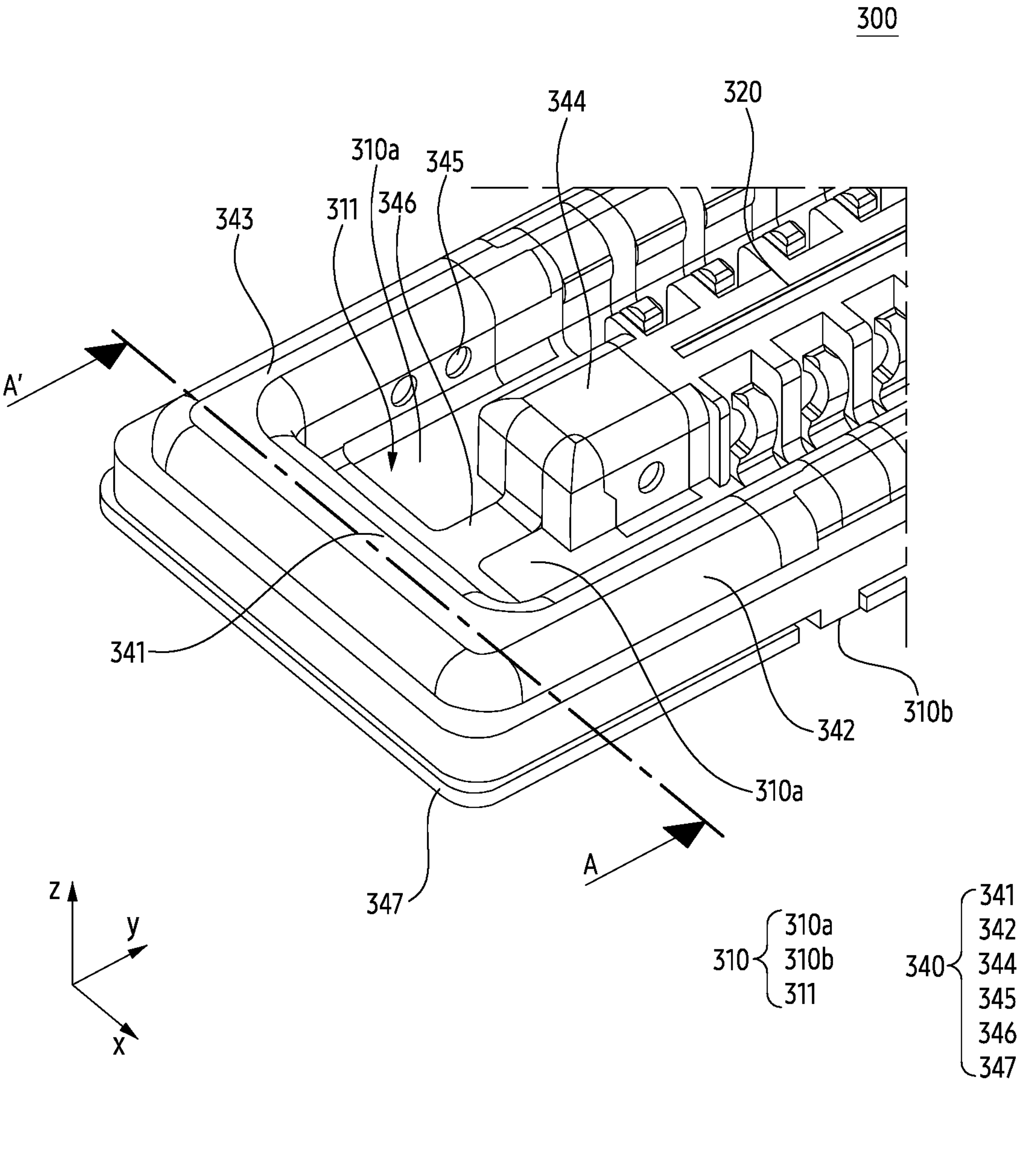
FIG. 3A is a diagram exemplarily illustrating a structure in which a conductive member of a first connector and a base are coupled to each other, according to an embodiment.
Figure 3B:
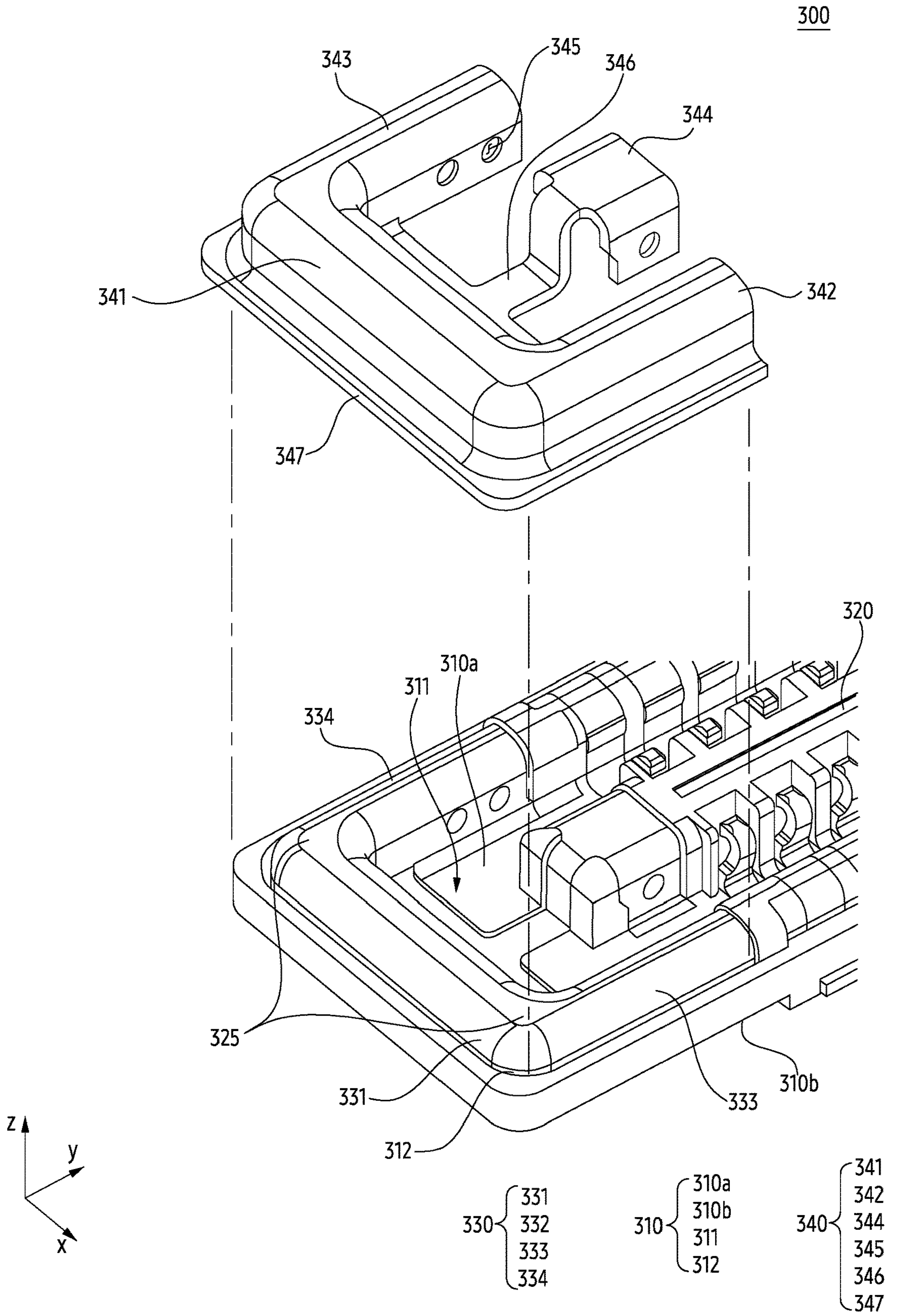
FIG. 3B is a diagram exemplarily illustrating a state in which the conductive member and the base of the first connector are disassembled, according to an embodiment.

According to the above-described embodiment, the pair of connectors 200 may reinforce the rigidity of the protruding portion 320 through the reinforcing member 380 included in the first connector 300, to reduce damage to the first connector 300, even when the pair of connectors 200 cannot be fastened at a designated position FIG. 3A is a view exemplarily illustrating a structure in which a conductive member of a first connector and a base are coupled to each other, according to an embodiment, and FIG. 3B is a view exemplarily illustrating a state in which the conductive member and the base of the first connector are disassembled, according to an embodiment.

Referring to FIGS. 3A and 3B, according to an embodiment, the first conductive member 340 of the first connector 300 may further include a connecting portion 346.

According to an embodiment, the connecting portion 346 may connect the first reinforcing portion 341 to the first contact portion 344. According to an embodiment, the connecting portion 346 may extend from the first reinforcing portion 341 to the first contact portion 344 along the second direction (e.g., along the y-axis). For example, the connecting portion 346 may connect a side surface of the first contact portion 344 facing the first sidewall 331 and the first reinforcing portion 341 by extending from a part of the first reinforcing portion 341 located on one surface 310*a* of the base 310.

According to an embodiment, the first conductive member 340 may integrally form a first reinforcing portion 341, a second reinforcing portion 342, a third reinforcing portion 343, a first contact portion 344, and a connecting portion 346. The connecting portion 346 may be electrically connected to the first reinforcing portion 341 when the first connector 300 is coupled to the second connector 400. For example, the first conductive member 340 may be manufactured through a deep-drawing process in which a material including a material such as a metal seated on a mold is pressed and molded. When the first conductive member 340 is not integrally formed, and the first connector 300 and the second connector 400 (e.g., the second connector 400 of FIG. 2C) are coupled to each other, thereby concentrating the stress on a portion to which the components constituting the first conductive member 340 are coupled. Also, when the first conductive member 340 is not integrally formed or a groove is formed stress is concentrated in the coupling portion or the groove, and thus the first conductive member 340 may be damaged. For example, when the first conductive member 340 is formed by a press process to expose a corner part, a groove may be formed at the corner part, and thus stress may be concentrated on the groove. According to embodiments, the first conductive member 340 may be integrally formed and have a continuous shape, thereby increasing the rigidity of the first connector 300.

According to an embodiment, the corners 325 formed by the sidewalls 330 may be located at one periphery of the first connector 300. For example, the corner 325 may be formed in a region where the first sidewall 331 and the third sidewall 333 are in contact with each other and a region where the first sidewall 331 and the fourth sidewall 334 are in contact with each other. The first conductive member 340 may be disposed to surround the corners 325 formed by the sidewalls 330 to protect the corners 325, thereby increasing the rigidity of the first connector 300. When the first connector 300 and the second connector 400 are coupled, the second connector 400 may be coupled to be dislocated from the first connector 300 due to misalignment or the like. When the first connector 300 and the second connector 400 are coupled to each other in a misaligned arrangement, the sidewalls 330 may be pressed and damaged or may be subjected to internal stress, which may be concentrated on the corners 325 of the sidewalls 330. When the first conductive member 340 does not surround the corner 325, a damage (e.g., cracks or stress fractures) may occur in an area adjacent to the corner 325 of the sidewalls 330. The first connector 300 according to an embodiment of the disclosure may prevent damage (e.g., cracks and/or stress fractures) from occurring through the conductive members 340 and 350 surrounding the corners 325.

According to an embodiment, the first conductive member 340 and the base 310 may be coupled (e.g., integrally formed) through injection molding. For example, the first conductive member 340 manufactured through a deep-drawing process may be seated on a mold for injection molding. Resin may be injected into the mold on which the first conductive member 340 is seated. The resin injected into the mold may be combined with the first conductive member 340 during cooling and may form the base 310 after cooling.

According to an embodiment, the first conductive member 340 may penetrate the base 310 and may be bent to contact the other surface **310*b* of the base 310. For example, the first conductive member 340 may pass through the insertion hole 312 of the base 310 formed along the peripheries of the sidewalls 330 and pass through the base 310**.

According to an embodiment, the first conductive member 340 may further include a supporting portion 347. The supporting portion 347 may define a portion of the first conductive member 340 which supports the periphery of the surface **310*b* of the base 310. When the first connector 300 and the second connector 400 are coupled to each other, the first connector 300 may receive a force in the downward direction (−z direction). The supporting portion 347 may support the surface 310*b* of the base 310 to prevent the first connector 300 from being damaged by a force applied by the second connector 400**.

According to the above-described embodiment, the first pair of connectors 200 may increase rigidity as the first conductive member 340 integrally forms the first reinforcing portion 341, the second reinforcing portion 342, the third reinforcing portion 343, the first contact portion 344, the connecting portion 346, and the supporting portion 347. According to an embodiment, as the first conductive member 340 supports the other surface **310*b* of the base 310, rigidity of the pair of connectors 200** can be increased.

Figure 4:
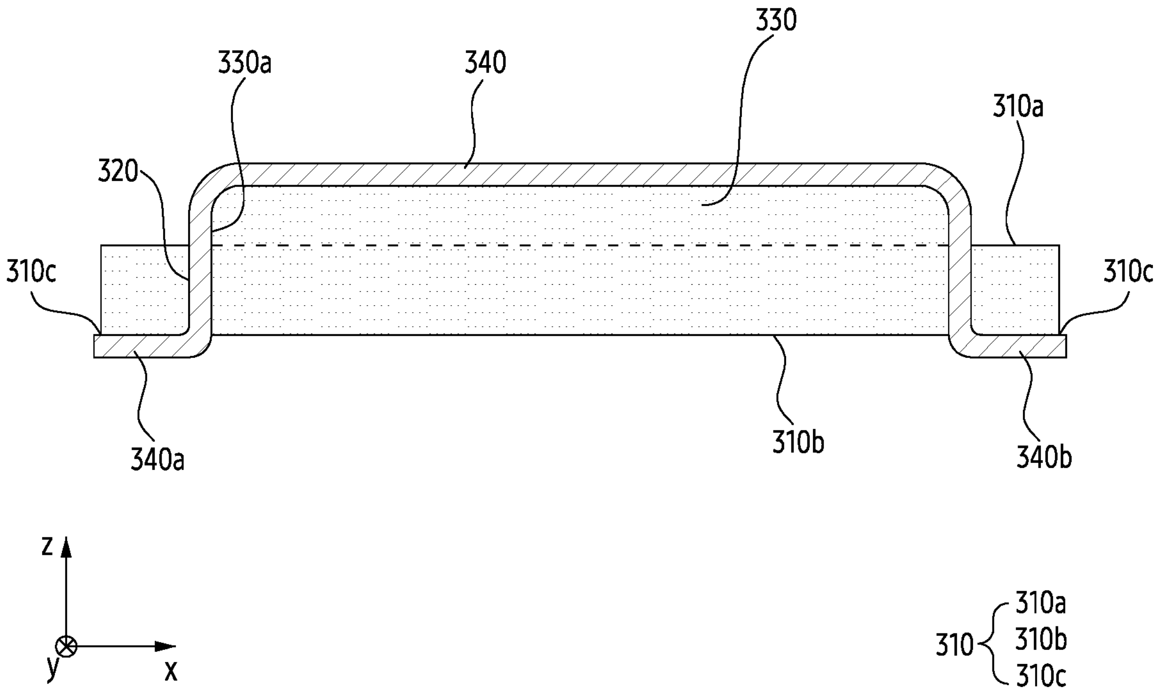
FIG. 4 is a cross-sectional view illustrating an example of a structure in which a conductive member and a base of a first connector are coupled, cut along line A-A' of FIG. 3A, according to an embodiment.

FIG. 4 is a cross-sectional view of the first connector shown in FIG. 3A taken along line A-A', and illustrating an example in which a conductive member 340 and a base 310 of a first connector 300 are coupled.

Referring to FIG. 4, the first conductive member 340 according to an embodiment may extend toward surface **310*b* of the base 310 along the surfaces 330*a* of the sidewalls 330 to penetrate the base 310. The insertion hole 312 may be formed to extend from one surface 310*a* of the base 310 to the surface 310*b***.

According to an embodiment, a portion of the first conductive member 340 may pass through the insertion hole 312 (shown in FIG. 3B). A portion of the first conductive member 340 passing through the insertion hole 312 may be bent to contact the surface **310*b* of the base 310. For example, the first portion 340*a* of the first conductive member 340 passing through the insertion hole 312 may be bent in the first direction (−x direction) to contact the other surface 310*b* of the base 310. The first portion 340*a* (e.g., the supporting portion 347 of FIGS. 3A and 3B) bent in the first direction may extend to the periphery 310*c* of the other surface 310*b* of the base 310 along the first direction. For another example, the second portion 340*b* (e.g., the supporting portions 347 of FIGS. 3A and 3B) of the first conductive member 340 passing through the insertion hole 312 may be bent in a direction (+x direction) opposite to the first direction to contact the other surface 310*b* of the base 310. The second portion 340*b* bent in a direction opposite to the first direction may extend to the periphery 310*c* of the other surface 310*b* of the base 310 along a direction opposite to the first direction. According to an embodiment, a portion of the first portion 340*a* in contact with the periphery 310*c* of the other surface 310*b* of the base 310 and a portion of the second portion 340*b* may form a supporting portion 347**.

According to the above-described embodiment, since the first connector 300 includes the first conductive member 340 supporting the other surface **310*b* of the base 310, rigidity of the first connector 300 may be increased. Accordingly, when coupled to the second connector 400, the first connector 300 having increased rigidity may not be damaged by a force applied by the second connector 300**.

Figure 5A:
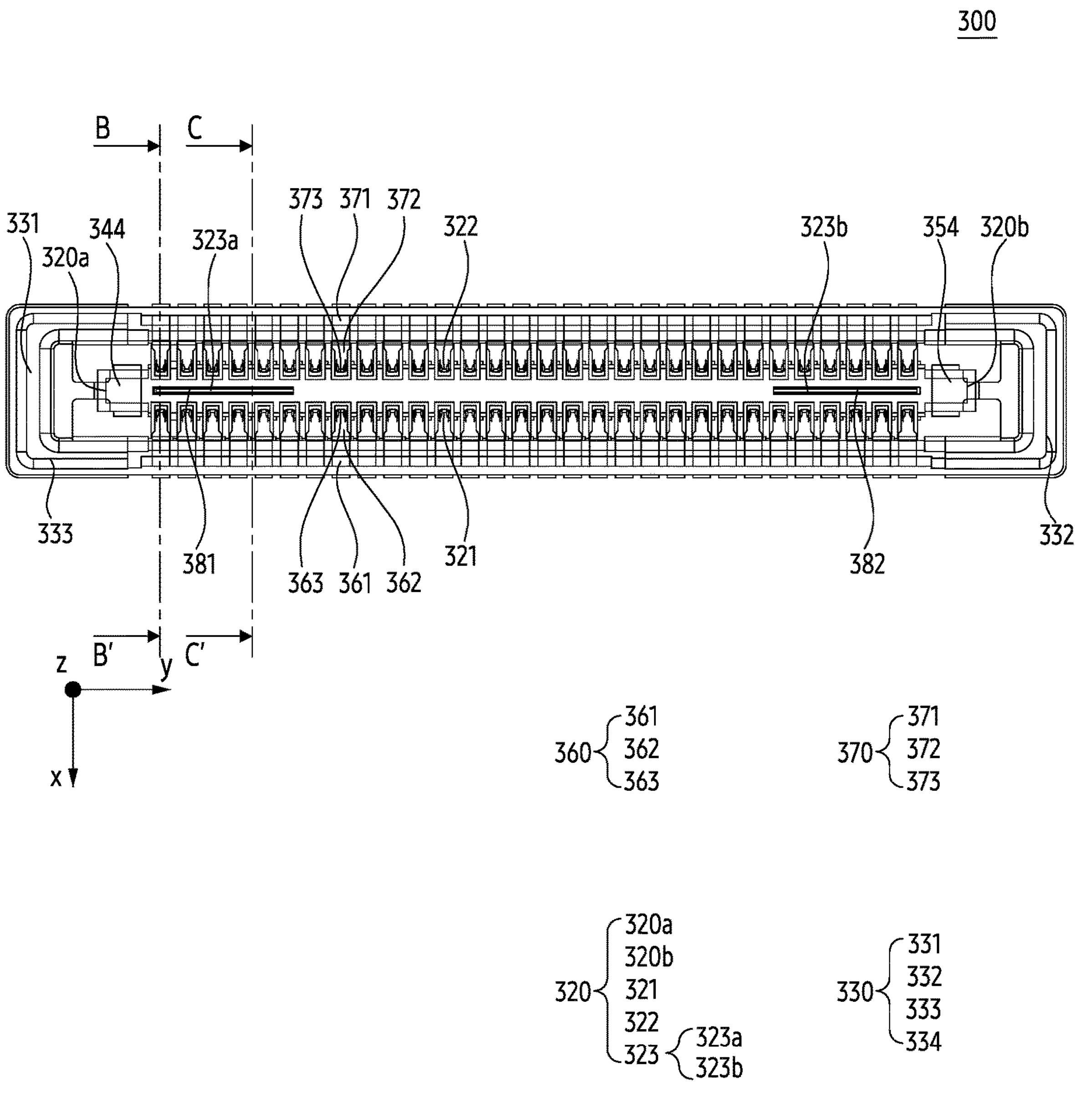
FIG. 5A is a top view of a first connector according to an embodiment.
Figure 5B:
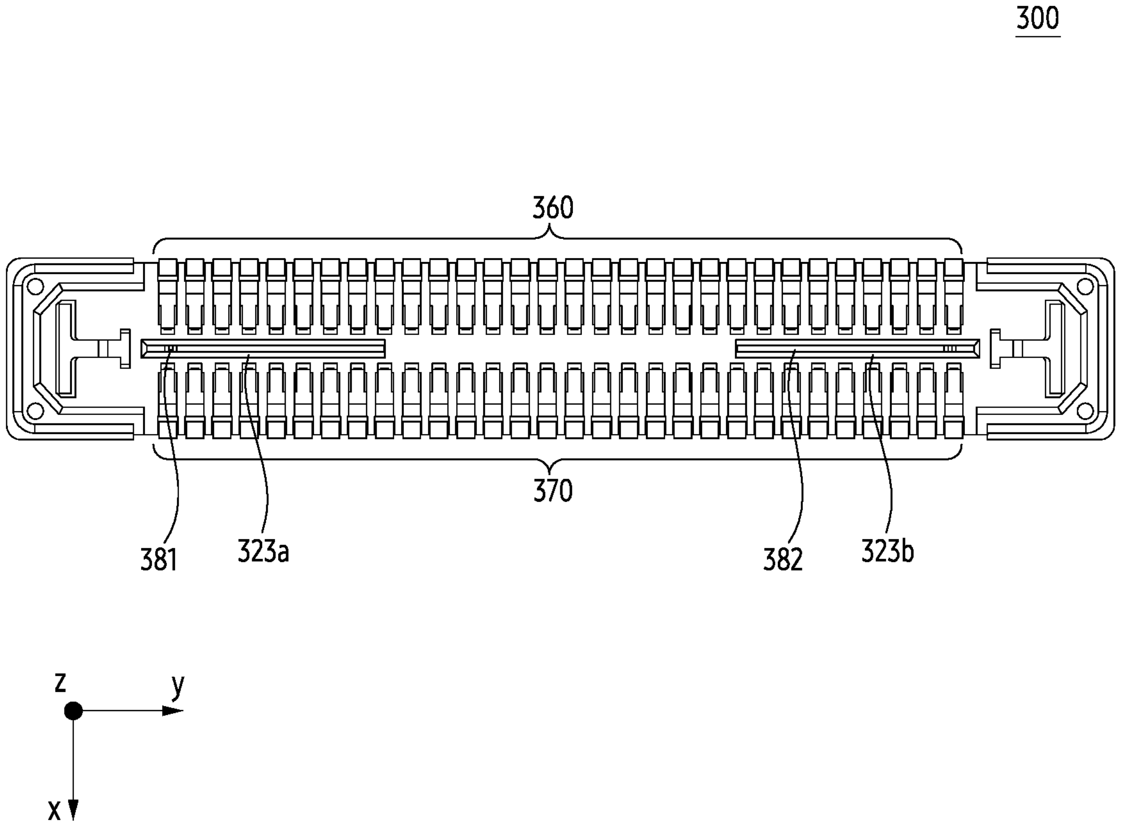
FIG. 5B is a rear view of the first connector according to an embodiment.

FIG. 5A is a top view of a first connector 300 according to an embodiment, and FIG. 5B is a rear view of the first connector 300 according to an embodiment.

Referring to FIGS. 5A and 5B, a plurality of accommodating grooves 321 and 322 may be formed in the protruding portion 320 of the first connector 300 according to an embodiment. A plurality of accommodating grooves 321 and 322 may extend downward (−z direction) along the side surface of the protruding portion 320 to penetrate the base 310. According to an embodiment, a plurality of accommodating grooves 321 and 322 may include a plurality of first accommodating grooves 321 and a plurality of second accommodating grooves 322. A plurality of first accommodating grooves 321 may be formed on one side surface of the protruding portion 320 facing the third sidewall 333 and spaced apart from each other. A plurality of second accommodating grooves 322 may be formed on other side surfaces of the protruding portion 320 facing the fourth sidewall 334 and spaced apart from each other.

According to an embodiment, a plurality of signal terminals 360 and 370 may include a plurality of first signal terminals 360 and a plurality of second signal terminals 370. Each of a plurality of signal terminals 360 and 370 may correspond to each of a plurality of accommodating grooves 321 and 322.

According to an embodiment, each of a plurality of first signal terminals 360 may extend from the third sidewall 333 in the first direction (−x direction). Each of a plurality of first signal terminals 360 may be spaced apart from each other to form a pitch and may be accommodated in each of a plurality of first accommodating grooves 321. According to an embodiment, each of a plurality of first signal terminals 360 may include a first fastening portion 361, a first extending portion 362, and a first movable portion 363. The first fastening portion 361 may surround a portion of the third sidewall 333 so that the signal terminal is fixed to the first connector 300. The first extending portion 362 may extend in the first direction (−x-axis direction) from one end of the first fastening portion 361 located in the recess 311. The first movable portion 363 may be accommodated in one of a plurality of first accommodating grooves 321.

According to an embodiment, a plurality of second signal terminals 370 may be symmetrical to a plurality of first signal terminals 360 with respect to the protruding portion 320. For example, each of a plurality of second signal terminals 370 may extend in a first direction (+x direction) from the fourth sidewall 334. Each of the plurality of second signal terminals 370 may be spaced apart from each other to form a pitch and may be accommodated in each of the plurality of second accommodating grooves 322. According to an embodiment, each of a plurality of second signal terminals 370 may include a second fastening portion 371, a second extending portion 372, and a second movable portion 373. The second fastening portion 371 may surround a portion of the fourth sidewall 334 so that the signal terminal is fixed to the first connector 300. The second extending portion 372 may extend from one end of the second fastening portion 371 located in the recess 311 in a direction opposite to the first direction (+x-axis direction). The second movable portion 373 may be accommodated in one of a plurality of second accommodating grooves 322.

According to an embodiment, the protruding portion 320 may include receiving portions 323 on which the reinforcing member 380 is disposed. The receiving portions 323 may extend with a length along the protruding portion 320. For example, the receiving portions 323 may extend downward (−z direction) from the protruding portion 320 to penetrate the base 310.

According to an embodiment, the receiving portion 323 may include a first receiving portion 323*a* adjacent to the first contact portion 344 and a second receiving portion 323*b* adjacent to the second contact portion 354. The first receiving portion 323*a* may be spaced apart from the first contact portion 344 and extend in the second direction (+y direction). The second receiving portion 323*b* may be spaced apart from the second contact portion 354 and extend in a direction (−y direction) opposite to the second direction.

According to an embodiment, the reinforcing member 380 may include a first reinforcing member 381 and a second reinforcing member 382. The first reinforcing member 381 may be spaced apart from the first contact part 344 in the second direction (+y direction) and accommodated in the first receiving part 323*a*. For example, the first reinforcing member 381 may extend in the second direction (+y direction) in the first receiving portion 323*a*. The second reinforcing member 382 may be spaced apart from the second contact portion 354 in a direction opposite to the second direction (−y direction) and may be accommodated in the second receiving portion 323*b*. For example, the second reinforcing member 382 may extend in a direction (−y direction) opposite to the second direction in the second receiving portion 323*b*.

According to an embodiment, the first reinforcing member 381 and the second reinforcing member 382 may be symmetrical with respect to a direction substantially perpendicular to a longitudinal direction of the first connector 300. For example, the distance from the first contact portion 344 to the first reinforcing member 381 may be substantially the same as the distance from the second contact portion 354 to the second reinforcing member 382.

According to an embodiment, the reinforcing member 380 may be disposed in an area adjacent to one end 320*a* of the protruding portion 320 or the other end 320*b* of the protruding portion 320. When the first connector 300 and the second connector (e.g., the second connector 400 of FIG. 2A) are coupled to each other, the second connector 400 may be coupled to be deviated from the first connector 300 due to misalignment or the like. When the first connector 300 and the second connector 400 are coupled to each other to be misaligned, stress may be concentrated in regions adjacent to both ends 320*a* and 320*b* of the protruding portion 320. When the reinforcing member 380 is not disposed adjacent to both ends 320*a* and 320*b* of the protruding portion 320, damage (e.g., cracks or stress fractures) may occur in regions adjacent to both ends 320*a* and 320*b* of the protruding portion 320. In the first connector 300 according to an embodiment, the reinforcing member 380 may be disposed in an area adjacent to both ends 320*a* and 320*b* of the protruding portion 320 to prevent damage (e.g., cracks and/or stress fractures) from occurring. For example, the first reinforcing member 381 may be disposed in a region of the protruding portion 320 adjacent to the first contact portion 344. As another example, the second reinforcing member 382 may be disposed in a region of the protruding portion 320 adjacent to the second contact portion 354. In any case, the reinforcing member 380 included in the first connector 300 according to one or more embodiments reinforces the rigidity of the protruding portion 320, thereby preventing the protruding portion 320 from being damaged by the second connector 400.

Figure 6A:
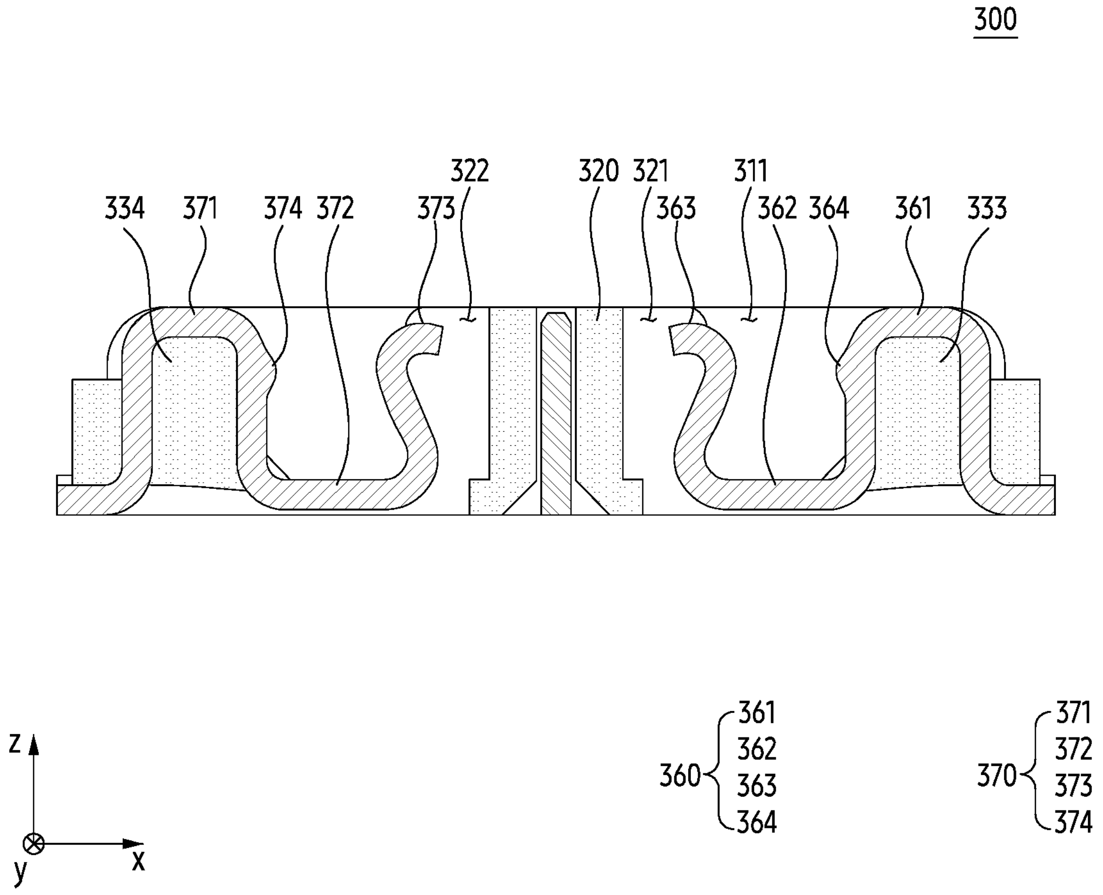
FIG. 6A is a view illustrating an example in which a first connector is cut along line B-B' of FIG. 5A, according to an embodiment.
Figure 6B:
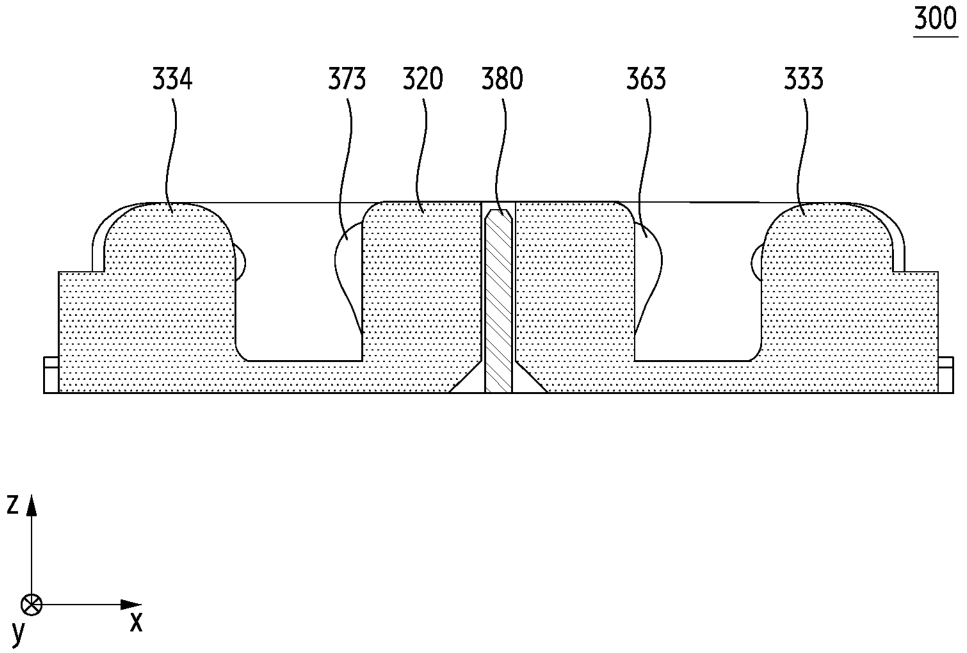
FIG. 6B is a view illustrating an example in which a first connector is cut along the C-C' of FIG. 5A, according to an embodiment.

FIG. 6A is a view illustrating an example of cutting the first connector 300 along line B-B' of FIG. 5A, and FIG. 6B is a view illustrating an example of cutting the first connector 300 along line C-C' of FIG. 5A, according to an embodiment.

FIG. 6A is a view illustrating an example in which the first connector 300 is cut along B-B' to include a plurality of signal terminals 360 and 370 of the first connector 300 of FIG. 5A, and FIG. 6B is a view illustrating an example in which a space between a plurality of signal terminals 360 and 370 of the first connector 300 of FIG. 5A is cut along C-C'.

Referring to FIGS. 6A and 6B, according to an embodiment, the first fastening portion 361 of one signal terminal of a plurality of first signal terminals 360 may be disposed on the third sidewall 333.

According to an embodiment, the first movable portion 363 may be connected to the first extending portion 362 and may be disposed to face the first fastening portion 361. For example, the first movable part 363 may extend upward (+z-axis direction) from one end of the first extending portion 362 adjacent to the protruding portion 320. One end of the first movable part 363 may be bent toward the protruding portion 320. The first movable part 363 may be accommodated in one of a plurality of first accommodating grooves 321. According to an embodiment, a plurality of first signal terminals (e.g., a plurality of first signal terminals 360 of FIG. 5A) may include a first fastening protrusion 364. The first fastening protrusion 364 may protrude from the first fastening portion 361 toward the protruding portion 320. For example, the first fastening protrusion 364 may protrude from one surface of the first fastening portion 361 in the first direction (−x axis direction).

According to an embodiment, the second fastening portion 371 of one of a plurality of second signal terminals 370 may be disposed on the fourth sidewall 334.

According to an embodiment, the second movable portion 373 may be connected to the second extending portion 372 and may be disposed to face the second fastening portion 371. For example, the second movable portion 373 may extend upward (e.g., along the z-axis) from one end of the second extending portion 372 adjacent to the protruding portion 320. One end of the second movable part 373 may be bent toward the protruding part 320. The second movable portion 373 may be accommodated in one of a plurality of second accommodating grooves 322. According to an embodiment, a plurality of second signal terminals (e.g., a plurality of second signal terminals 370 of FIG. 5A) may include a second fastening protrusion 374. The second fastening protrusion 374 may protrude from the second fastening portion 371 toward the protruding portion 320. For example, the second fastening protrusion 374 may protrude from one surface of the second fastening portion 371 in a direction opposite to the first direction (+x-axis direction).

According to an embodiment, the reinforcing member 380 may be disposed within the protruding portion 320. For example, the reinforcing member 380 may be disposed in a receiving portion (e.g., the receiving portions 323*a* and 323*b* of FIG. 5A) formed in the protruding portion 320. The reinforcing member 380 may extend in a direction (+z-axis direction) from the other surface (e.g., the opposite surface 310*b* of FIG. 3A) of the base (e.g., the base 310 of FIG. 2B) toward one surface (e.g., one side 310*a* of FIG. 3A) of the base 310 within the protruding portion 320. According to the above-described embodiment, the first connector 300 includes a reinforcing member 380 for reinforcing the rigidity of the protruding portion 320, thereby preventing the protruding portion 320 from being damaged by the second connector 400.

Figure 7:
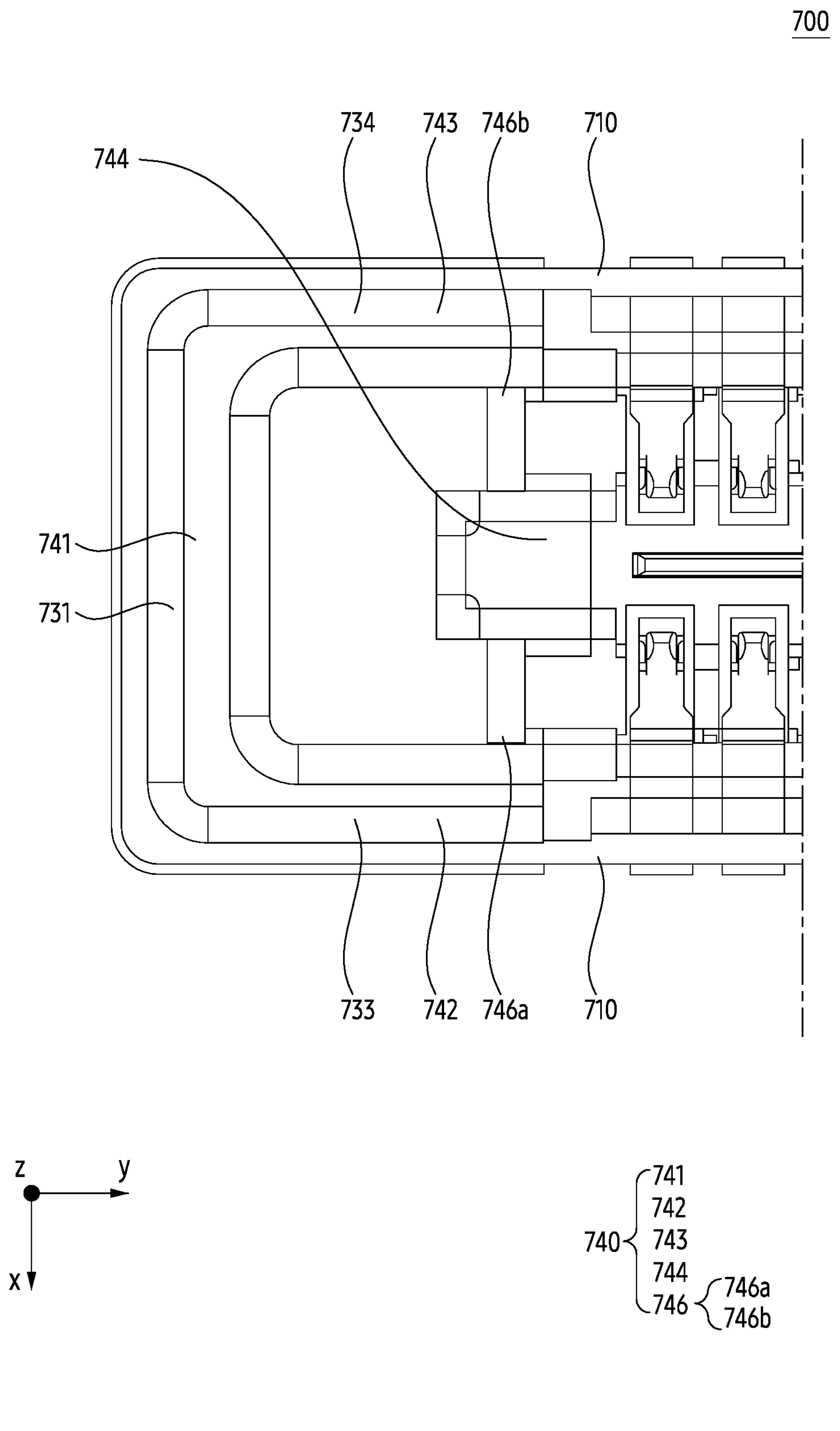
FIG. 7 is a top view of a first connector including a first connecting portion and a second connecting portion according to an embodiment.

FIG. 7 is a top view of a first connector 700 including a first connecting portion and a second connecting portion according to an embodiment.

Referring to FIG. 7, the first connector 700 according to an embodiment may include a base 710, a protrusion 720, sidewalls 730, and a first conductive member 740. Since each of the base 710, the protrusion 720, the sidewalls 730, and the first conductive member 740 of FIG. 7 may be substantially the same as the base 310, the protruding portion 320, the sidewalls 330, and the first conductive member 340 of FIGS. 2A and/or 2B respectively, repeated descriptions will be omitted.

According to an embodiment, the first conductive member 740 may include a first reinforcing portion 741 surrounding the first sidewall 731, a second reinforcing portion 742 surrounding a region including a corner where the first sidewall 731 and the third sidewall 733 contact each other, and a third reinforcing portion 743 surrounding a region including a corner where the first sidewall 731 and the fourth sidewall 734 contact each other. According to an embodiment, the corner located where the first sidewall 731 and the third sidewall 733 meet one another and the corner located where the first sidewall 731 and the fourth sidewall 734 meet one another define a region including a periphery that is protected from damage (e.g., cracks and/or stress fractures) by the surrounding first conductive member 740 According to an embodiment, a first contact portion 744 surrounds one end of the protruding portion 320 (not shown in FIG. 7).

According to an embodiment, the first conductive member 740 may further include a connecting portion 746. The connecting portion 746 may further include a first connecting portion 746*a* and a second connecting portion 746*b*. The first connecting portion 746*a* may facilitate connection between the second reinforcing portion 742 and the first contact portion 744. According to an embodiment, the first connecting portion 746*a* may extend from the second reinforcing portion 742 to the first contact portion 744 along the first direction (−x-axis direction). The second connecting portion 746*b* may facilitate connection between the third reinforcing portion 743 and the first contact portion 744. According to an embodiment, the second connecting portion 746*b* may extend from the third reinforcing portion 743 to the first contact portion 744 in a direction (e.g., the +x-axis direction) opposite to the first direction.

According to an embodiment, the first conductive member 740 may integrally form the first reinforcing portion 741, the second reinforcing portion 742, the third reinforcing portion 743, the first contact portion 744, the first connecting portion 746*a*, and the second connecting portion 746*b*. The first connecting portion 746*a* may be electrically connected to the second reinforcing portion 742 when the first connector 700 is coupled to the second connector 400. The second connecting portion 746*b* may be electrically connected to the third reinforcing portion 743 when the first connector 300 is coupled to the second connector 400.

According to the above-described embodiment, the first connector 700 may include a first connecting portion 746*a* and a second connecting portion 746*b* connected to the first contact portion 744 in different directions, thereby increasing rigidity. According to an embodiment, when the first connector 300 is coupled to the second connector 400, the first conductive member 740 may increase a contact area of the conductive member by integrally forming the first reinforcing portion 741, the second reinforcing portion 742, the third reinforcing portion 743, the first connection portion 746*a*, and the second connecting portion 746*b*. The pair of connectors (e.g., the pair of connectors 200 of FIG. 2A) can increase the amount of current that may flow between the first connector 700 and the second connector 400.

Figure 8A:
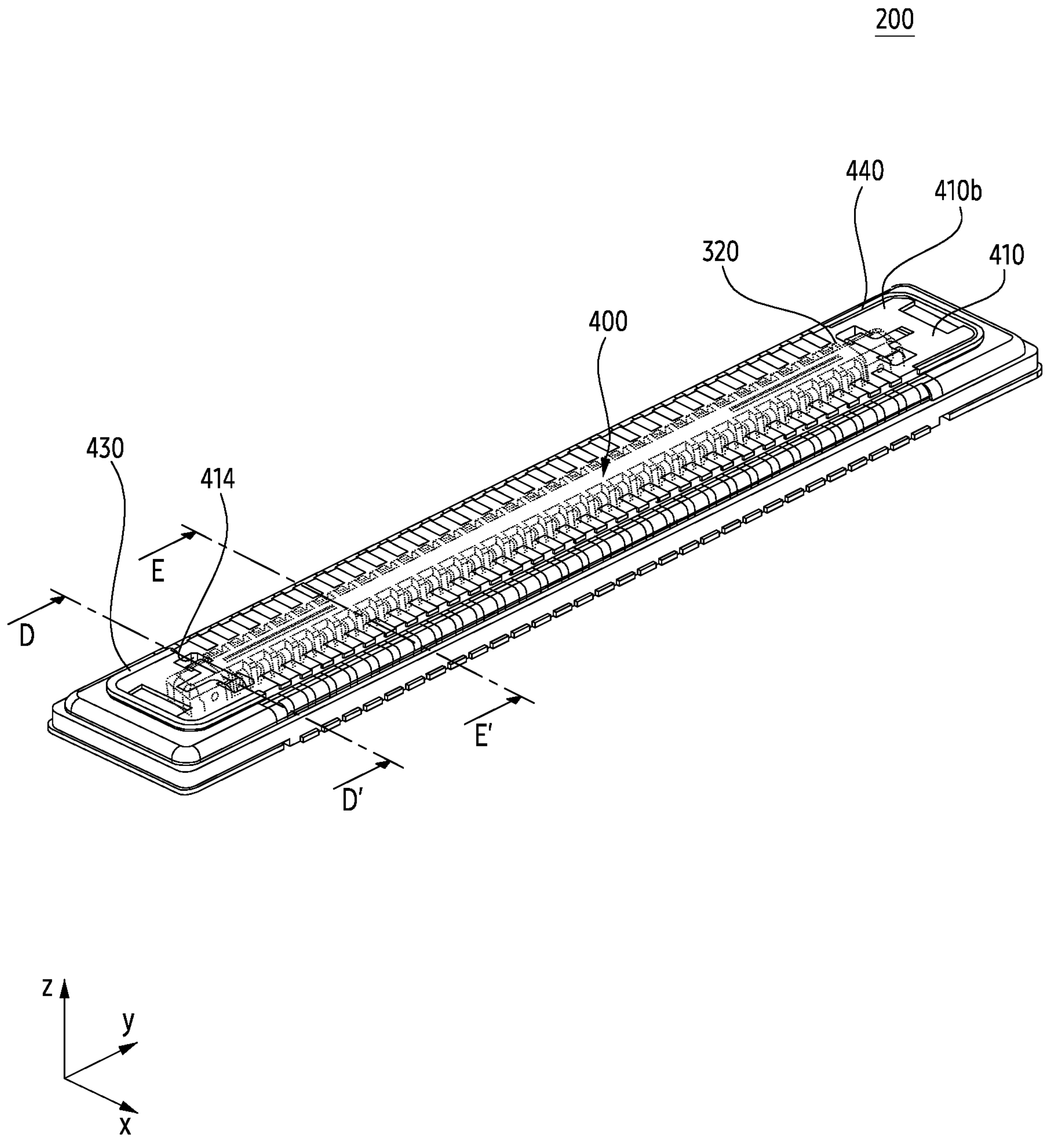
FIG. 8A is a view exemplarily illustrating a state in which a first connector and a second connector are coupled, according to an embodiment.
Figure 8B:
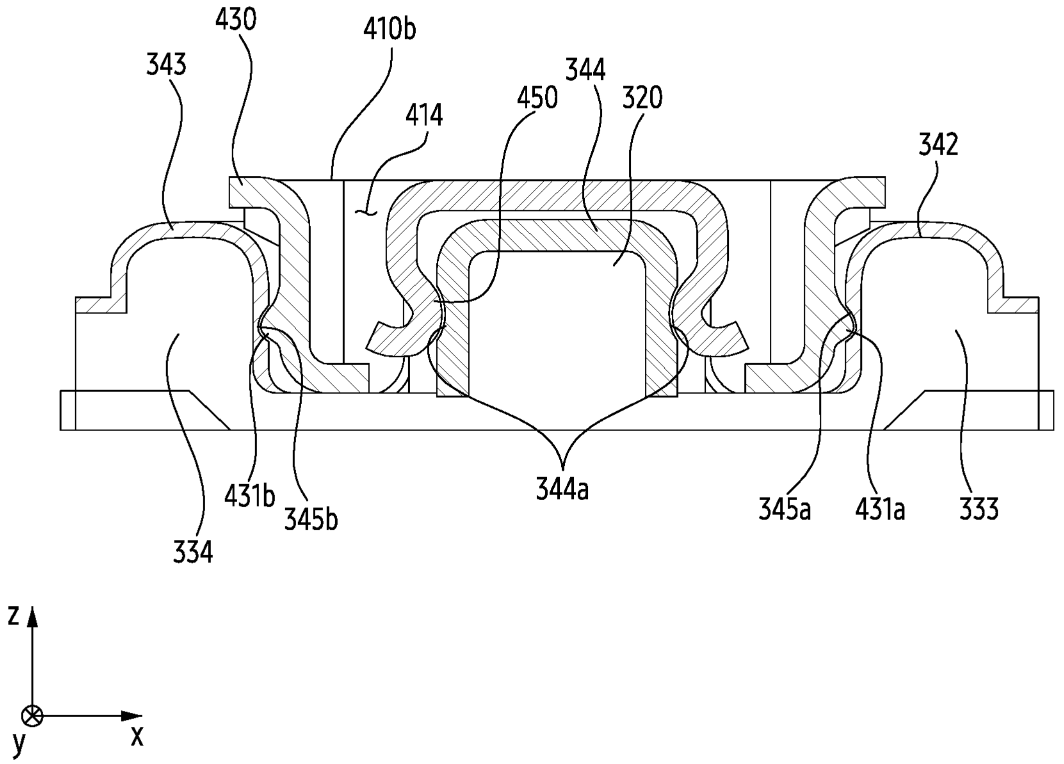
FIG. 8B is a view illustrating an example in which a state in which a first connector and a second connector are coupled is cut along a line D-D' of FIG. 8A, according to an embodiment.
Figure 8C:
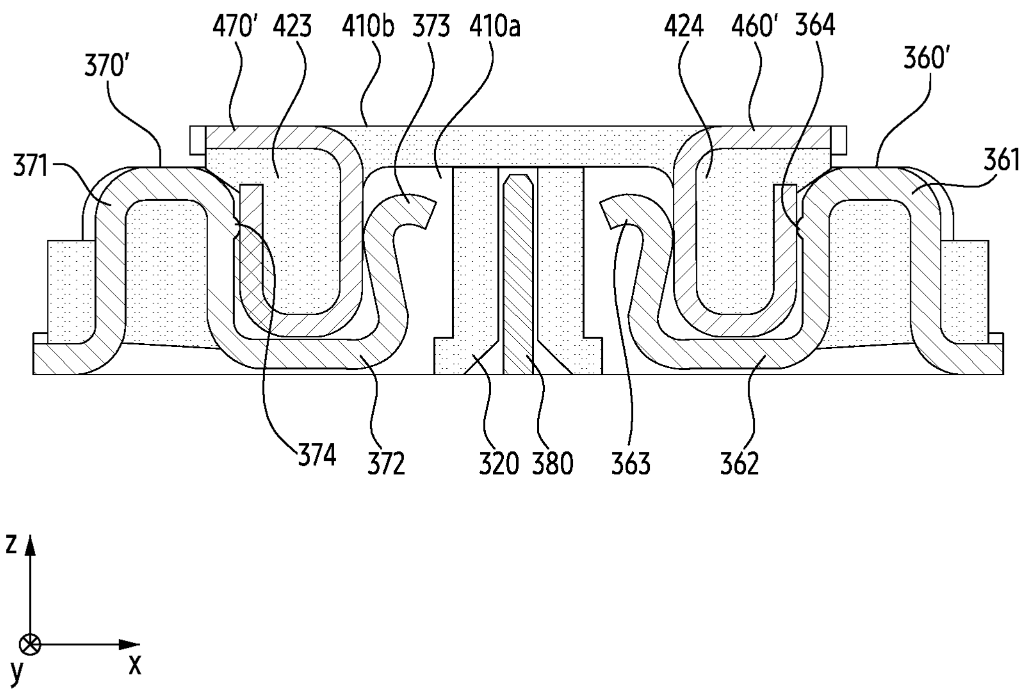
FIG. 8C is a view illustrating an example in which a state in which a first connector and a second connector are coupled is cut along line E-E' of FIG. 8A, according to an embodiment.

FIG. 8A is a diagram exemplarily illustrating a state in which the first connector and the second connector are coupled according to an embodiment, FIG. 8B is a diagram illustrating an example of a state in which the first connector and the second connector are coupled cut along line D-D' of FIG. 8A according to an embodiment, and FIG. 8C is a diagram illustrating an example of a state in which the first connector and the second connector are coupled cut along line E-E' of FIG. 8A according to an embodiment.

FIG. 8B is a diagram illustrating an example in which the first connector 300 and the second connector 400 are cut along the D-D' to include the first contact portion 344 of the first connector 300 of FIG. 8A, and FIG. 8C is a diagram illustrating an example in which the first connector 300 and the second connector 400 are cut along the E-E' to include a plurality of signal terminals 360 and 370 of the first connector 300 of FIG. 8A.

Referring to FIGS. 8A, 8B, and 8C, the mold 410 of the second connector 400 according to an embodiment may include a through hole 414. The through hole 414 may penetrate from one surface 410*a* of the mold 410 to the other surface 410*b* (e.g., an opposite surface) of the mold 410 facing surface 410*a* (e.g., located opposite surface 410*a*).

According to an embodiment, the second connector 400 may be manufactured through injection molding. For example, a resin may be injected into a mold in which the first metallic member 430 and the second metallic member 440 manufactured through a deep drawing process are seated. The resin injected into the mold may be coupled to the first metallic member 430 and the second metallic member 440 in the process of cooling and may form the mold 410 after cooling. When the second connector 400 is manufactured through injection molding, a separate structure may be seated on a mold on which the first metallic member 430 and the second metallic member 440 are seated in order to form an accommodating portion (e.g., the accommodating portion 412 of FIG. 2C) accommodating the movable terminal 450. After the structure is seated, a resin may be injected into the mold. The structure for forming the accommodating portion 412 may be removed after the resin is cooled to form the mold 410. As the structure is removed, a through hole 414 may be formed in the mold 410.

According to an embodiment, when the first connector 300 and the second connector 400 are coupled, the movable terminal 450 of the second connector 400 may contact the terminal groove 344*a* of the first connector 300. When the first connector 300 and the second connector 400 are coupled, the first connector 300 may receive relatively more force than the second connector 400. When the movable terminal 450 is disposed in the first connector 300, a hole similar to the through hole 414 may be formed in the base 310 of the first connector 300 during the manufacturing process of the first connector 300. When the hole is formed in the base 310, rigidity of the first connector 300 may decrease. According to an embodiment, the pair of connectors 200 may protect the first connector 300 receiving a relatively large force by disposing the movable terminal 450 on the second connector 400.

According to an embodiment shown in FIG. 8B, the contact groove 345 may include a first contact groove 345*a* and a second contact groove 345*b*. The first contact groove 345*a* may be formed on a side surface of the second reinforcing portion 342 facing the protruding part 320 in the first direction (−x direction). The second contact groove 345*b* may be formed on a side surface of the third reinforcing part 343 facing the protruding part 320 in a direction (+x direction) opposite to the first direction.

According to an embodiment, the contact protrusion 431 may include a first contact protrusion 431*a* and a second contact protrusion 431*b*. The first contact protrusion 431*a* may be formed on an outer surface of the first metallic member 430 facing the second reinforcing part 342 when the first connector 300 and the second connector 400 are coupled. For example, the first contact protrusion 431*a* may protrude from the outer surface of the first metallic member 430 in a direction (+x direction) opposite to the first direction. According to an embodiment, when the first connector 300 and the second connector 400 are coupled, the first contact protrusion 431*a* may be seated in the first contact groove 345*a* of the first connector 30 to form an electrical contact.

According to an embodiment, the second contact protrusion 431*b* may be formed on an outer surface of the first metallic member 430 facing the third reinforcing portion 343 when the first connector 300 and the second connector 400 are coupled. For example, the second contact protrusion 431*b* may protrude in the first direction (−x-axis direction) from the outer surface of the first metallic member 430. According to an embodiment, when the first connector 300 and the second connector 400 are coupled, the second contact protrusion 431*b* may be seated in the second contact groove 345*b* of the first connector 300 to form an electrical contact.

According to an embodiment shown in FIG. 8C, the first connector 300 may include a plurality of first signal terminals 360 and a plurality of second signal terminals 370. The second connector 400 may include a plurality of first signal members 460 and second signal members 470. When the first connector 300 is coupled to the second connector 400, a plurality of first signal terminals 360 can be placed in contact with a plurality of first signal members 460, and a plurality of second signal terminals 370 can be placed in contact with a plurality of second signal members 470 to electrically connect the first connector 300 and the second connector 400.

According to an embodiment, each of the plurality of first signal terminals 360 may include a first fastening protrusion 364, and each of the plurality of second signal terminals 370 may include a second fastening protrusion 374. The first fastening protrusion 364 disposed on one signal terminal 360' of a plurality of first signal terminals 360 can placed be in contact with one signal member 460' of a plurality of first signal members 460. The second fastening protrusion 374 disposed on one signal terminal 370' of a plurality of second signal terminals 370 can be placed in contact with one signal member 470' of a plurality of second signal members 470.

According to the above-described embodiment, the pair of connectors 200 may include the movable terminal 450 in the second connector 400 rather than the first connector 300 to protect the first connector 300. By protecting the first connector 300 that receives a relatively large force compared to the second connector 400, the lifespan of the pair of connectors 200 can be increased.

According to an embodiment, a connector (e.g., the first connector 300 of FIG. 2B) may comprise a base (e.g., the base 310 of FIG. 2B); a protruding portion (e.g., protruding portion 320 of FIG. 2B) protruding from one surface of the base; sidewalls (e.g., the sidewalls 330 of FIG. 2B) surrounding the protruding portion and including a first sidewall (e.g., the first sidewall 331 of FIG. 2B) extending in a first direction, a second sidewall (e.g., the second sidewall 332 of FIG. 2B) extending parallel to the first sidewall, a third sidewall (e.g., the third sidewall 333 of FIG. 2B) extending in a second direction perpendicular to the first direction from one end of the first sidewall to one end of the second sidewall, and a fourth sidewall (e.g., the fourth sidewall 334 of FIG. 2B) extending in the second direction from another end of the first sidewall to another end of the second sidewall; and a conductive member including a first reinforcing portion (e.g., the first reinforcing portion 341 of FIG. 2B) covering the first sidewall, a second reinforcing portion (e.g., the second reinforcing portion 342 of FIG. 2B) covering a region including a corner (e.g., corner 325 of FIG. 3B) where the third sidewall and the first sidewall are in contact, and a third reinforcing portion (e.g., the third reinforcing portion 343 of FIG. 2B) covering a region including a corner where the fourth sidewall and the first sidewall are in contact, and a contact portion (e.g., the first contact portion 344 of FIG. 2B) covering one end of the protruding portion, wherein, the contact portion may be electrically connected to a movable terminal (e.g., the movable terminal 450 of FIG. 2C) of another connector (e.g., the second connector 400 of FIG. 2C), when coupled to another connector distinct from the connector, and wherein the conductive member may integrally form the first reinforcing portion, the second reinforcing portion, the third reinforcing portion, and the contact portion.

According to an embodiment, the conductive member may penetrate the base and may be bent to be in contact with the other surface of the base and may further include a supporting portion (e.g., supporting portions 347 of FIGS. 3A and 3B) disposed on the other surface of the base to support the periphery of the other surface of the base.

According to an embodiment, the contact portion may include a terminal groove (e.g., the first terminal groove 344*a* of FIG. 2B) accommodating a part of the movable terminal of another connector when coupled to another connector.

According to an embodiment, the second reinforcing portion may include a first contact groove (e.g., the first contact groove 345*a* of FIG. 8B) formed on a side surface of the second reinforcing portion facing the protruding portion, and the third reinforcing portion may include a second contact groove (e.g., the second contact groove 345*b* of FIG. 8B) formed on a side surface of the third reinforcing portion facing the protruding portion.

According to an embodiment, the conductive member may further include a connecting portion (e.g., connecting portions 346 of FIGS. 3A and 3B) extending in the second direction from the first reinforcing portion to the contact portion to connect the first reinforcing portion and the contact portion.

According to an embodiment, the conductive member may further include a first connecting portion (e.g., the first connecting portion 746*a* of FIG. 7) extending in the first direction from the second reinforcing portion to the contact portion to connect the second reinforcing portion and the contact portion, and a second connecting portion (e.g., the second connecting portion 746*b* of FIG. 7) extending in a direction opposite to the first direction from the third reinforcing portion to the contact portion to connect the third reinforcing portion and the contact portion.

According to an embodiment, the connector may further comprise a plurality of a first signal terminal (e.g., a plurality of first signal terminals 360 of FIG. 2B) spaced apart from each other along the third sidewall, and spaced apart from the second reinforcing portion, wherein, each of the plurality of the first signal terminal may include a fastening portion (e.g., the first fastening portion 361 of FIG. 5A) covering a part of the third sidewall, a extending portion (e.g., the first extending portion 362 of FIG. 5A) extending in the first direction from the fastening portion toward protruding portion and a movable portion (e.g., the first movable portion 363 of FIG. 5A) connected to the extending portion and disposed to face the fastening portion, wherein the protruding portion may include a plurality of accommodating groove (e.g., a plurality of first accommodating grooves 321 of FIG. 5A) accommodating the movable portion of each of the plurality of the first signal terminal.

According to an embodiment, each of the plurality of the first signal terminal may further include a fastening protrusion protrudes from the fastening portion toward the protruding portion.

According to an embodiment, the connector may further comprise a plurality of a second signal terminal spaced apart from each other along the fourth sidewall, and spaced apart from the third reinforcing portion, and wherein, the plurality of the second signal terminal may be symmetrical to the plurality of the first signal terminal with respect to the protruding portion.

According to an embodiment, the connector may further comprise a second conductive member (e.g., the second conductive member 350 of FIG. 2B) distinct from a first conductive member which is the conductive member, wherein, the second conductive member may include a fourth reinforcing part (e.g., the fourth reinforcing portion 351 of FIG. 2B) covering the second sidewall, a fifth reinforcing part (e.g., the fifth reinforcing portion 352 of FIG. 2B) covering a region including a corner where the third sidewall and the second sidewall are in contact, a sixth reinforcing part (e.g., the sixth reinforcing portion 353 of FIG. 2B) covering a region including a corner where the fourth sidewall and the second sidewall are in contact; and a second contact portion (e.g., the second contact portion 354 of FIG. 2B) distinct from a first contact portion which is the contact portion and surrounding the other end of the protruding portion; and may integrally form the fourth reinforcing part, the fifth reinforcing part, the sixth reinforcing part, and the second contact part.

According to an embodiment, the second contact portion may include a terminal groove (e.g., the terminal groove 354 of FIG. 2B) accommodating a part of the movable terminal of another connector when coupled to another connector.

According to an embodiment, the connector may further comprise a reinforcing member (e.g., the reinforcing member 380 of FIG. 2B) spaced apart from the contact portion in the second direction and reinforcing rigidity of the protruding portion, and wherein, the protruding portion may include a receiving portion extending with a length in the second direction and wherein, the reinforcing member may be disposed in the receiving portion (e.g., the receiving portion 323 of FIG. 5A).

According to an embodiment, the connector may further comprise a second contact portion (e.g., the second contact portion 354 of FIG. 2B) distinct from a first contact portion, which is the contact portion, and surrounding the other end of the protrusion; and a second reinforcing member (e.g., the second reinforcing member 382 of FIGS. 5A and 5B) distinct from a first reinforcing member (e.g., the first reinforcing member 381 of FIGS. 5A and 5B), which is the reinforcing member, and spaced apart from the second contact portion in a direction opposite to the second direction; wherein, a distance from the second contact portion to the second reinforcing member may be equal to a distance from the first contact portion to the first reinforcing member.

According to an embodiment, an electronic device (e.g., the electronic device 101 of FIG. 1) may comprise a first connector (e.g., the first connector 300 of FIG. 2B) disposed on the printed circuit board; and a second connector (e.g., the second connector 400 of FIG. 2C) detachably coupled to the first connector, wherein the first connector may include a base (e.g., the base 310 of FIG. 2B); a protruding portion (e.g., protruding portion 320 of FIG. 2B) protruding from one surface of the base; sidewalls (e.g., sidewalls 330 of FIG. 2B) surrounding the protruding portion and including a first sidewall (e.g., the first sidewall 331 of FIG. 2B) extending in a first direction, a second sidewall (e.g., the second sidewall 332 of FIG. 2B) extending parallel to the first sidewall, a third sidewall (e.g., the third sidewall 333 of FIG. 2B) extending in a second direction perpendicular to the first direction from one end of the first sidewall to one end of the second sidewall, and a fourth sidewall (e.g., the fourth sidewall 334 of FIG. 2B) extending in the second direction from another end of the first sidewall to another end of the second sidewall; and a conductive member including a first reinforcing portion (e.g., the first reinforcing portion 341 of FIG. 2B) covering the first sidewall, a second reinforcing portion (e.g., the second reinforcing portion 342 of FIG. 2B) covering a region including a corner (e.g., corner 325 of FIG. 3B) where the third sidewall (e.g., the third reinforcing portion 343 of FIG. 2B) and the first sidewall are in contact, and a third reinforcing portion covering a region including a corner where the fourth sidewall and the first sidewall are in contact, and a contact portion (e.g., the contact portion 344 of FIG. 2B) covering one end of the protruding portion, wherein the conductive member (e.g., the first conductive member 340 of FIG. 2B) may integrally form the first reinforcing portion, the second reinforcing portion, the third reinforcing portion, and the contact portion, wherein the second connector may include a mold (e.g., mold 410 of FIG. 2C); and a movable terminal (e.g., the movable terminal 450 of FIG. 2C) disposed on the mold, deformable by the contact portion and in contact with the contact portion when coupled with the first connector, wherein the contact portion of the first connector may be electrically connected to the movable terminal of the second connector when the first connector is coupled to the second connector.

According to an embodiment, the mold may include an accommodating portion (e.g., the accommodating portion 412 of FIG. 2C) accommodating a part of the movable terminal when the first connector is coupled to the second connector, and a through-hole (e.g., the through hole 414 of FIG. 8A) penetrating from one surface (e.g., one surface 410*a* of FIG. 2C)) in contact with the movable terminal to the other surface (e.g., the other surface 410*b* of FIG. 2C)) facing the one surface.

According to an embodiment, the contact portion may include a terminal groove (e.g., terminal groove 344*a* of FIG. 2B) accommodating a part of the movable terminal of the second connector when coupled to the second connector.

According to an embodiment, the second reinforcing portion may include a first contact groove (e.g., the first contact groove 345*a* of FIG. 8B) formed on a side surface of the second reinforcing portion facing the protruding portion, wherein, the third reinforcing part may include a second contact groove (e.g., the second contact groove 345*b* of FIG. 8B) formed on a side surface of the third reinforcing portion facing the protruding portion, wherein, the second connector may further include a plurality of partition walls (e.g., the partition walls 420 of FIG. 2C) surrounding the protruding portion when coupled to the first connector; and a metallic member (e.g., the first metallic member 430 of FIG. 2C) surrounding a part of a region of the plurality of the partition walls; and wherein the metallic member may include a contact protrusion (e.g., the contact protrusion 431 of FIG. 2C) protruding from an outer side surface of the metallic member to be accommodated in the first contact groove and the second contact groove when coupled to the first connector.

According to an embodiment, the metallic member may cover a region including a corner where one partition wall of the plurality of the partition walls and another partition wall of the plurality of the partition wall are in contact.

According to an embodiment, the first connector may further include a plurality of a signal terminal (e.g., a plurality of first signal terminals 360 of FIG. 2B) spaced apart from each other along the third sidewall, and spaced apart from the second reinforcing portion, wherein each of the plurality of the signal terminal may include a fastening portion (e.g., the first fastening portion 361 of FIG. 5A) covering a part of the third sidewall, an extending portion (e.g., the first extending portion 362 of FIG. 5A) extending in the first direction from the fastening portion toward the protruding portion, and a movable portion (e.g., the first movable portion 363 of FIG. 5A) connected to the extending portion and disposed to face the fastening portion, and wherein, the protruding portion may include a plurality of an accommodating groove (e.g., a plurality of first accommodating grooves 321 of FIG. 5A) accommodating the movable portion of each of the plurality of the signal terminal, and wherein the second connector may include a plurality of signal members (a plurality of signal members 460 and 470 of FIG. 2C) disposed on at least one of the plurality of the partition walls to be in contact with each of the plurality of the signal terminals when coupled to the first connector.

According to an embodiment, each of the plurality of the signal terminals may include a fastening protrusion (e.g., the fastening protrusion 364 of FIG. 8C) protruding from the fastening protrusion toward the protruding portion, and wherein, the fastening protrusion may be electrically connected to one of the plurality of the signal members of the second connector.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A connector comprising:
- a base;
- a center wall disposed on the base;
- a sidewall, disposed on the base, enclosing the center wall such that a space for receiving another connector is formed between the center wall and the sidewall, the sidewall including:
  - a first sidewall portion extending in a first direction,
  - a second sidewall portion extending in a second direction substantially perpendicular to the first direction, wherein the first and the second sidewall portions join each other at a first corner portion of the sidewall,
  - a third sidewall portion extending in the second direction substantially parallel to the second sidewall portion, wherein the first and the third sidewall portions join each other at a second corner portion of the sidewall; and
- a conductive member including:
  - a first portion, covering the first sidewall portion, and being in contact with the first sidewall portion,
  - a second portion, covering a side surface of the first corner portion of the sidewall, and being in contact with the side surface of the first corner portion of the sidewall,
  - a third portion, covering a side surface of the second corner portion of the sidewall, and being in contact with the side surface of the second corner portion of the sidewall, and
- wherein the first portion of the conductive member extends from the second portion of the conductive member to the third portion of the conductive member,
- wherein the first portion, the second portion, and the third portion of the conductive member are integrally formed.

2. The connector of claim 1, wherein the second portion includes a first contact groove formed on a side surface of the second portion facing the center wall, the first contact groove accommodating at least a portion of a first terminal of the another connector when the another connector is coupled to the connector, and
- the third portion includes a second contact groove formed on a side surface of the third portion facing the center wall, the second contact groove accommodating at least a portion of a second terminal of the another connector when the another connector is coupled to the connector.

3. The connector of claim 1, wherein the conductive member further includes:
- a contact portion, covering an end portion of the center wall, configured to contact a movable terminal of the another connector; and
- a connecting portion extending in the second direction from the first portion to the contact portion to connect the first portion and the contact portion,
- wherein the first portion, the second portion, the third portion, the contact portion, and the connecting portion of the conductive member are integrally formed.

4. The connector of claim 1,
- wherein the second portion of the conductive member further extends in the second direction to cover a portion of the second sidewall portion,
- wherein the third portion of the conductive member further extends in the second direction to cover a portion of the third sidewall portion, and
- wherein the conductive member further includes:
- a contact portion, covering an end portion of the center wall, configured to contact a movable terminal of the another connector,
- a first connecting portion extending from the second portion of the conductive member to the contact portion of the conductive member, and
- a second connecting portion extending from the third portion of the conductive member to the contact portion of the conductive member.

5. The connector of claim 1, further comprising a plurality of first signal terminals spaced apart from each other along the second sidewall portion, the plurality of first signal terminals being spaced apart from the second portion,
- wherein each of the plurality of first signal terminals further includes:
- a fastening portion covering a part of the second sidewall portion,
- an extending portion extending in the first direction from the fastening portion toward the center wall, and
- a movable portion connected to the extending portion and disposed to face the fastening portion,
- wherein the center wall includes a plurality of accommodating grooves accommodating the movable portion of each of the plurality of first signal terminals.

6. The connector of claim 5, wherein each of the plurality of first signal terminals further includes a fastening protrusion protruding from the fastening portion toward the center wall.

7. The connector of claim 5, further comprising
- a plurality of second signal terminals spaced apart from each other along the third sidewall portion, the plurality of second signal terminals being spaced apart from the third portion, and
- wherein the plurality of second signal terminals are arranged symmetrical to the plurality of first signal terminals with respect to the center wall.

8. The connector of claim 1, further comprising:
- an another conductive member distinct from the conductive member,
- wherein the sidewall includes a fourth sidewall portion substantially parallel to the first sidewall portion, wherein the second sidewall portion and the fourth sidewall portion join each other at a third corner portion of the sidewall,
wherein the third sidewall portion and the fourth sidewall portion join each other at a fourth corner portion of the sidewall, and
wherein the another conductive member includes:
a fourth portion covering the fourth sidewall portion,
a fifth portion covering the third corner portion of the sidewall, and
a sixth portion covering the fourth corner portion of the sidewall;
wherein the fourth portion of the another conductive member extends from the fifth portion of the another conductive member to the sixth portion of the conductive member, and
wherein the fourth portion, the fifth portion, and the sixth portion of the another conductive member are formed integrally.

9. The connector of claim 8,
wherein the another conductive member includes a contact portion surrounding another end of the center wall and formed integrally with the fourth portion, the fifth portion, and the sixth portion of the another conductive member, and
wherein, when coupled to the another connector, the contact portion of the another conductive member includes a terminal groove accommodating a part of a movable terminal of the another connector.

10. The connector of claim 1,
wherein the conductive member includes a contact portion surrounding an end of the center wall,
wherein the connector further comprises:
a reinforcing member spaced apart from the contact portion in the second direction and reinforcing rigidity of the center wall, and
wherein the center wall includes a receiving portion extending in a certain length in the second direction, and
wherein the reinforcing member is disposed in the receiving portion.

11. The connector of claim 10, further comprising:
another contact portion distinct from the contact portion and surrounding another end of the center wall; and
another reinforcing member, distinct from the reinforcing member, being spaced apart from the another contact portion in a direction opposite to the second direction,
wherein a distance from the another contact portion to the another reinforcing member is equal to a distance from the contact portion to the reinforcing member.

12. An electronic device comprising:
a first connector disposed on a printed circuit board; and
a second connector detachably coupled to the first connector;
wherein the first connector includes:
a base;
a protruding portion protruding from a surface of the base;
a plurality of sidewalls surrounding the protruding portion, the plurality of sidewalls including a first sidewall extending in a first direction, a second sidewall extending parallel to the first sidewall, a third sidewall extending in a second direction perpendicular to the first direction from one end of the first sidewall to one end of the second sidewall, and a fourth sidewall extending in the second direction from another end of the first sidewall to another end of the second sidewall; and
a conductive member including:
a first reinforcing portion, covering the first sidewall, and being in contact with the first sidewall,
a second reinforcing portion, covering and being in contact with a side surface of a first corner portion where the third sidewall and the first sidewall meet,
a third reinforcing portion covering and being in contact with a side surface of a second corner portion where the fourth sidewall and the first sidewall meet, and
a contact portion covering one end of the protruding portion,
wherein the first reinforcing portion, the second reinforcing portion, the third reinforcing portion, and the contact portion are integrally formed,
wherein the second connector includes:
a mold; and
a movable terminal disposed on the mold, the movable terminal being deformable by the contact portion and being in contact with the contact portion when coupled with the first connector;
wherein the contact portion of the first connector is electrically connected to the movable terminal of the second connector when the first connector is coupled to the second connector.

13. The electronic device of claim 12,
wherein the mold includes:
an accommodating portion accommodating a part of the movable terminal when the first connector is coupled to the second connector, and
a through-hole penetrating from a surface of the mold in contact with the movable terminal to another surface of the mold opposite to the surface of the mold.

14. The electronic device of claim 12,
wherein the contact portion includes a terminal groove accommodating a part of the movable terminal of the second connector when coupled to the second connector.

15. The electronic device of claim 12,
wherein the second reinforcing portion includes a first contact groove formed on a side surface of the second reinforcing portion facing the protruding portion,
wherein the third reinforcing portion includes a second contact groove formed on a side surface of the third reinforcing portion facing the protruding portion,
wherein the second connector further includes:
a plurality of partition walls surrounding the protruding portion when coupled to the first connector; and
a metallic member surrounding a part of a region of the plurality of the partition walls,
the metallic member further including a contact protrusion protruding from an outer side surface of the metallic member to be accommodated in the first contact groove and the second contact groove when coupled to the first connector.

16. The electronic device of claim 15,
wherein the metallic member is configured to cover a region including a corner with which one partition wall of the plurality of the partition walls and another partition wall of the plurality of the partition walls are in contact.

17. The electronic device of claim 15,
wherein the first connector further includes a plurality of signal terminals spaced apart from each other along the third sidewall, the plurality of signal terminals being spaced apart from the second reinforcing portion,
wherein each of the plurality of signal terminals includes:
a fastening portion covering a part of the third sidewall, an extending portion extending in the first direction from the fastening portion toward the protruding portion, and a movable portion connected to the extending portion and disposed to face the fastening portion, and wherein the protruding portion includes a plurality of accommodating grooves accommodating the movable portion of each of the plurality of signal terminals, and wherein the second connector includes a plurality of signal members disposed on at least one of the plurality of the partition walls to be in contact with each of the plurality of the signal terminals when coupled to the first connector.

18. The electronic device of claim 17, wherein each of the plurality of the signal terminals includes a fastening protrusion protruding from the fastening portion toward the protruding portion, and wherein the fastening protrusion is electrically connected to one of the plurality of the signal members of the second connector.

19. The electronic device of claim 1, wherein the conductive member is formed directly on the base, wherein the second portion of the conductive member further covers an entire top surface of the first corner portion opposite to the base, and wherein the third portion of the conductive member further covers an entire top surface of the second corner portion opposite to the base.

20. The electronic device of claim 19, wherein the second portion of the conductive member further covers another side surface of the first corner portion opposite to the side surface of the first corner portion, extending from the top surface of the first corner portion, and wherein the third portion of the conductive member further covers another side surface of the second corner portion opposite to the side surface of the second corner portion, wherein the top surface of the first corner portion extends from the side surface to the another side surface thereof, and wherein the top surface of the second corner portion extends from the side surface to the another side surface thereof.

* * * * *